(12) United States Patent (10) Patent No.: US 8,914,196 B1
Breed et al. (45) Date of Patent: Dec. 16, 2014

(54) CRASH SENSOR SYSTEMS UTILIZING VEHICULAR INERTIAL PROPERTIES

(71) Applicant: Automotive Technologies International, Inc., Boonton, NJ (US)

(72) Inventors: David S Breed, Miami Beach, FL (US); Olexander Leonets, Kyiv (UA)

(73) Assignee: Automotive Technologies International, Inc., Boonton, NJ (US)

( * ) Notice: Subject to any disclaimer, the term of this patent is extended or adjusted under 35 U.S.C. 154(b) by 0 days.

(21) Appl. No.: 14/069,760

(22) Filed: Nov. 1, 2013

(51) Int. Cl.
*B60R 21/0136* (2006.01)

(52) U.S. Cl.
CPC .................................. *B60R 21/0136* (2013.01)
USPC ............. 701/45; 701/70; 701/32.3; 701/32.4; 180/271; 340/436

(58) Field of Classification Search
CPC .... B60R 21/0136; B60R 21/013; B60R 21/01
USPC .................... 701/45, 70, 32.3, 32.4; 180/271; 340/436
See application file for complete search history.

(56) References Cited

U.S. PATENT DOCUMENTS

| | | | |
|---|---|---|---|
| 5,375,059 A | 12/1994 | Kyrtsos et al. | |
| 5,657,025 A | 8/1997 | Ebner et al. | |
| 6,052,647 A | 4/2000 | Parkinson et al. | |
| 6,157,891 A | 12/2000 | Lin | |
| 6,167,347 A | 12/2000 | Lin | |
| 6,278,945 B1 | 8/2001 | Lin | |
| 6,292,750 B1 | 9/2001 | Lin | |
| 6,311,129 B1 | 10/2001 | Lin | |
| 6,424,914 B1 | 7/2002 | Lin | |
| 6,449,559 B2 | 9/2002 | Lin | |
| 6,480,789 B2 | 11/2002 | Lin | |
| 6,496,778 B1 | 12/2002 | Lin | |
| 6,768,944 B2 * | 7/2004 | Breed et al. | 701/301 |
| 7,085,637 B2 | 8/2006 | Breed et al. | |
| 7,284,769 B2 * | 10/2007 | Breed | 280/735 |
| 7,295,925 B2 | 11/2007 | Breed et al. | |
| 7,418,346 B2 | 8/2008 | Breed et al. | |
| 7,426,437 B2 | 9/2008 | Breed et al. | |
| 7,635,043 B2 | 12/2009 | Breed | |
| 7,832,762 B2 | 11/2010 | Breed | |

(Continued)

FOREIGN PATENT DOCUMENTS

DE 10148667 A1 1/2003
WO 2005119290 A1 12/2005

OTHER PUBLICATIONS

Abstract of DE 10148667.

*Primary Examiner* — Mary Cheung
*Assistant Examiner* — Brian P Sweeney
(74) *Attorney, Agent, or Firm* — Brian Roffe

(57) ABSTRACT

Electronic crash sensor system for a vehicle including at least one inertial measurement device arranged on the vehicle to measure an inertial property of the vehicle, a processor that incorporates or executes a crash sensing algorithm that determines whether the vehicle is sensing a crash based on the inertial property measured by each inertial measurement device and a positioning system arranged on the vehicle to provide its position. The inertial property measured by each inertial measurement device is modified based on the position and then provided to the crash sensing algorithm such that the crash sensing algorithm determines whether the vehicle is sensing a crash based on the modified inertial property measured by each inertial measurement device. Self-testing of each inertial measurement device is not performed.

25 Claims, 11 Drawing Sheets

(56) References Cited

U.S. PATENT DOCUMENTS

| | | |
|---|---|---|
| 7,840,355 B2 | 11/2010 | Breed et al. |
| 7,899,621 B2 | 3/2011 | Breed et al. |
| 7,957,898 B2 | 6/2011 | Hoshizaki et al. |
| 7,962,285 B2 * | 6/2011 | Breed .......................... 701/472 |
| 8,000,897 B2 | 8/2011 | Breed et al. |
| 8,010,287 B1 | 8/2011 | Frank et al. |
| 8,019,501 B2 | 9/2011 | Breed |
| 8,024,084 B2 | 9/2011 | Breed |
| 8,036,788 B2 | 10/2011 | Breed |
| 8,060,282 B2 | 11/2011 | Breed |
| 8,068,979 B2 | 11/2011 | Breed |
| 8,229,624 B2 | 7/2012 | Breed |
| 2014/0129088 A1 | 5/2014 | Meissner et al. |

* cited by examiner

Variants of the accelerometer calibration system

| № | Parameters | Calibration system variant | | |
|---|---|---|---|---|
| | | Variant 1 "Maximal" | Variant 2** "Basic" | Variant 3 "Minimal" |
| | Accelerometer/gyro to be calibrated | Ax,Ay,Az/ Gx,Gy,Gz | Ax,Ay*,Az*/ Gx*,Gy*,Gz* | Ax,Ay*,Az*/ Gx*,Gy*,Gz* |
| | Algorithm type | Kalman Filter | Kalman Filter | Attitude Filter |
| | Data used | | | |
| | Accelerometers | | | |
| 1 | Ax | + | + | + |
| 2 | Ay | + | + | + |
| 3 | Az | + | + | + |
| | Gyroscopes | | | |
| 4 | Gx | + | + | + |
| 5 | Gy | + | + | + |
| 6 | Gz | + | + | + |
| | GPS | | | |
| 7 | Vgps | +/-*** | - | - |
| 8 | Flgps | +/- | - | - |
| 9 | LAgps | +/- | - | - |
| 10 | Hgps | +/- | - | - |
| 11 | Odometer | +/- | + | + |
| | Zero velocity | | | |
| 12 | Vy=0 | +/- | + | + |
| 13 | Vz=0 | +/- | + | + |

*Calibration of only a part of the sensor parameters (incomplete calibration)
** The possibility of implementation of variant 2 requires testing by computer simulation
*** "+/-" means that this information can or cannot be used together with other parameters

*Fig. 5*

CRASH SENSOR SYSTEMS UTILIZING VEHICULAR INERTIAL PROPERTIES

FIELD OF THE INVENTION

The present invention relates generally to electronic crash sensor systems for vehicles and techniques to improve the reception and processing of a crash pulse by the crash sensor system to optimize actuation of occupant protection devices, and more specifically, to techniques to improve the accuracy of the crash pulse in order to base deployment of airbags thereon.

BACKGROUND OF THE INVENTION

General

Automobile production worldwide is exploding. As the economies in developing countries improve, the desire for automobiles by their citizens is fueling the increase automobile production worldwide. China now produces many more vehicles than the United States and is exporting many vehicles to other developing countries. With this projected vast increase in production, there is a corresponding need to significantly reduce the costs of such vehicles since they are targeted for consumers with little money. Nevertheless, purchasers of such vehicles are cognizant of safety and therefore, these vehicles must approach and preferably equal Western safety standards.

As is well known, electronics and sensors of all types are getting smaller and less expensive at an exponential rate. However, to achieve more reliable and optimized vehicles, the wiring and connectors in vehicles must be similarly improved. Today, the largest source of warrantee repairs on vehicles in the United States is the wiring system composed of wires and connectors. This is also one of the most expensive parts of the vehicle. If these developments are combined, the vehicle of the future will have more sophisticated sensors and electronics but fewer wires and connectors. This implies that sensors will tend to be more centrally located and sensors at the periphery of the vehicle will be minimized. In the field of crash sensing, information that a crash is in progress, therefore, needs to be sensed at a centralized location using a sensor system that does not require peripheral sensors and their associated wires. This may require a fine-tuning of the vehicle structure so that information that a crash is in progress can be directed to the sensor location mechanically without using wires. This can be done without adding significant new structure, but rather, through careful design of the structure that essentially already exists.

Occupant Protection Problem

In the 1990s, an attempt was made to sense all crashes from one point in the vehicle. This was known as single point sensing. Analysis showed, however, that this goal was not achievable due to the fact that certain types of crashes could not be reliably sensed in time from a central sensor location. These crashes were primarily related to crashes into poles and to marginal crashes. For pole crashes, the front of the vehicle would offer little resistance to the intruding pole until the pole struck the engine, at which time the occupant had moved sufficiently close to the airbag that the deployment of the airbag could seriously injure or kill the occupant. The marginal crashes related to soft crashes into yielding structures where the crash pulse reaching the single point sensor was stretched in time and thus misinterpreted by the crash sensor resulting in either a no fire or a late fire of the airbag. The no fire cases in these marginal crashes did not result in significant injury to the occupant as the impact velocity of the occupant with the airbag module or instrument panel was not sufficient to cause significant injury. However, for the pole and the late firing cases, the danger was that the airbag would deploy as the occupant neared or was already in contact with the airbag. Since the relative velocity was low, the occupant would not have been significantly injured due to impact with the vehicle interior, however, the airbag deployment itself caused serious injury. In these cases, if the airbag not deployed, the occupant would not likely have been seriously injured.

The industry chose to abandon single point sensor because of these late firing cases rather than suppress the airbag in such cases. With the development, however, of aspirated inflators, airbag modules can now be designed such that deployment will be stopped and the deployment gases diverted if the occupant is loading the airbag module cover or if airbag deployment is initiated but interacts with the occupant as he or she approaches the airbag module. Thus, the problem of late deployments, at least for frontal impacts, has been solved without requiring occupant sensors or crush zone mounted crash sensors. To summarize, airbag modules can now be designed which will not injure the occupant regardless of his or her position relative to the airbag cover. The methods by which this is accomplished are covered in patents and patent applications referenced herein. An object of this invention, therefore, is to produce a single point sensor for sensing frontal impacts and rollovers, and for possible use in vehicles with aspirated inflators.

Present-day airbag systems utilize sensors that are mounted in the crush zone of the vehicle so that they measure that a crash is in progress by determining that one part of the vehicle has undergone an above-threshold velocity change and therefore the rest of the vehicle will similarly go through such a velocity change at a later time. These sensors forecast the velocity change of the bulk of the vehicle. These forecasts are not perfect and there are many people injured or killed every year because of the failure of these forecasts. Undercarriage hang-ups or poles that break shortly after being struck are examples of such accidents. Similarly, impacts into soft structures can cause a serious delay in airbag triggering resulting in occupant injuries.

SUMMARY OF THE INVENTION

Proposed Sensor System for Frontal Impacts and Rollover Sensing

Electronic crash sensors currently in production comprise one or at most two MEMS accelerometers that measure acceleration at the sensor location. These accelerometers are typically produced by micromachining a single crystal of silicon and the sensing elements are frequently in the form of a beam or tuning fork. The silicon crystal typically has residual stresses that can cause the mechanical structure of the accelerometer to change geometrically as a function of time and/or temperature unpredictably. As a result, the properties of the accelerometer similarly change with time and temperature. To overcome this inherent problem in the device, additional apparatus is designed into the accelerometer to permit the acceleration sensing beam or tuning fork to be excited and its response tested. Thus, these accelerometers are continuously self-tested and adjusted as their properties change to maintain the device in proper calibration. This adds cost and complexity to the accelerometer and sensor software design. This self-testing feature also increasingly complicates the device design if more than one axis is simultaneously tested.

Accelerometers are also used in navigation systems. However, rather than calibrating each inertial device, the integrals of the device outputs are adjusted so that they agree with measured location as determined by a GPS. Thus, output from an accelerometer is integrated to achieve a velocity and again to achieve a displacement and the displacement is then modified based on the known displacement as determined by the GPS. This modification coefficient is retained until the next GPS update is obtained. This principle of using GPS to correct the accelerometer output can be done in a different manner as taught here. Rather than modify the displacement of the device as in the navigation case, the accelerations and or velocities are adjusted. These modified accelerations and velocities can then be used to determine that the vehicle is undergoing a crash. Although the approach is similar to the navigational approach, the application is different in that it is not the location of the sensing device that needs to be corrected, but its fundamental acceleration values and/or velocities.

Thus, rather than self-testing the accelerometer, the integrated output of the accelerometer is compared with the GPS location of the vehicle and the discrepancy is used to modify either the acceleration values, in the case of accelerometers, and the angular velocities in the case of gyroscopes and those data are entered into a crash sensing algorithm incorporated into or executed by a processor, e.g., associated with a computer. If additional accelerometers or gyroscopes are added to the device, the additional complexity due to the requirement to self-test each accelerometer or gyroscope is no longer necessary. In fact, the Kalman filter or neural network technologies not only permits calculations to be corrected for each accelerometer and gyroscope but also considers the effects that errors in one accelerometer or gyroscope, such as due to alignment errors, may have on the readings of another accelerometer or gyroscope and also eliminates those errors.

Navigation systems frequently use an inertial measurement unit (IMU). Such a unit consists of three accelerometers and three gyroscopes permitting both angular motion and linear displacements of the device to be measured. Through the Kalman filter or neural network, the GPS can be used to correct the angular and displacement positions of the device. For the case where an IMU is used as a crash sensor, as herein described, the GPS can yield corrections to the individual measurements of the inertial devices rather than to their integrals in the case of angular motions and to the velocities or accelerations in the case of the accelerometers.

These individual readings can then be fed to crash and rollover sensing algorithms, incorporated or executed by a processor of, for example, computer, to be used to determine the state of the vehicle. Thus, by eliminating the self-testing requirement, the IMU becomes inexpensive to manufacture as compared to a comparable device where self-testing has been implemented. This method of error correction particularly corrects for errors in alignment of the accelerometers and gyroscopes with the vehicle coordinate system which is a significant source of errors that cannot be eliminated through self-testing.

The IMU can be designed using three accelerometers and three gyroscopes as in the conventional IMU or, alternatively, six accelerometers can be used. There are advantages and disadvantages to each design and both will be discussed below and both designs fall within the invention.

The changes to the mechanical properties of the MEMS devices due to aging and temperature generally act slowly. The properties of the inertial devices, therefore, do not change rapidly and thus if the vehicle enters a zone of poor GPS reception, there is little loss in accuracy of the inertial devices until GPS reception is restored even if this takes several minutes. This method of correction of the inertial devices is believed to be considerably more accurate than the standard self-test methods used by conventional airbag crash sensors.

Additionally, since changes in the atmospheric disturbances of the GPS signals are also occur slowly, differential corrections are not required, similarly simplifying the system design. Although there may be significant errors in the actual displacements due to such effects, the change in these displacements from one instance of GPS reception to another, later instance of GPS reception, separate by a period of lack of GPS reception, are quite accurate.

To use GPS to correct the IMU accelerometers and gyroscopes, accurate absolute positioning is not required, since it is the change in position as measured by the GPS and IMU that will be compared. Thus, differential corrections are not needed. However, the accuracy of this position change is valuable and thus the change in the phase of the carrier frequency from one reception to another can be used. This allows a measurement accuracy of a centimeter or better. To use this concept for angular displacements, three or more antennas with a separation between any pair of at least a few centimeters can be used, e.g., with a separation from about 1 to about 10 centimeters or more.

Although various numbers of inertial devices can be effectively used with this invention, at significantly less than $1 per accelerometer, little cost penalty is incurred by using more rather than fewer devices. The computational complexity is minimal since the computations do not need to be carried out frequently and a common microprocessor can be used for both the GPS and inertial device computations. In some implementations, additional devices such as a temperature sensor or additional accelerometers tuned to different sensitivity ranges can be added in order to improve the crash sensing capabilities of the system and also render the device useful for other applications, such as navigation and electronic stability control. Accelerometers are now available where the range is dynamically settable so that the same accelerometer can be used at one time for navigation and at another time for crash sensing. Various versions of the Kalman filter or neural network can be used to couple the GPS and IMU systems together as will be discussed below. In some cases, a trained neural network can be used to supplement a Kalman filter rather than as a substitute therefor.

Generally, a GPS employs a single receiving antenna. In such an implementation, the location of a point coincident with the antenna can be calculated. To determine the angular orientation of the vehicle, additional antennas can be used at little additional cost. A combination of three antennas, for example, will provide angular orientation information as well as position information. Multiple antennas also provide the opportunity of providing some correction of multipath effects as is known by those skilled in the art, and for more accurate angular motion determination as discussed above.

In a preferred implementation, the power requirements of the system are sufficiently low that significant drain on the vehicle battery will be avoided. Thus, in a preferred implementation of the invention the GPS and IMU system will be always on. If the vehicle is not moving for a significant time period, the devices can be placed in a sleep mode and awakened on any significant motion. Although this system is primarily intended for crash and rollover sensing, a sufficiently inexpensive device can be replicated at various other locations in the vehicle to be used for such tasks as electronic stability control or navigational purposes. Alternatively, a single system can provide the required information for electronic stability control, navigation as well as crash and rollover sensing.

Although a primary application of this invention is for frontal and rollover crash sensing, the system can be expanded to sense side and rear impacts. Side and rear impact sensing may require a careful design of the vehicle structure such that information from an impact into the side or rear of the vehicle is mechanically transmitted to the crash sensor location. Although crash and rollover sensor algorithms will generally operate on the linear and angular accelerations and velocities using derived equations, in some cases, the required information may lend itself to analysis using pattern recognition algorithms.

Of course, other sensors including an odometer, optical or sound sensors can be incorporated into the system to improve the system performance and some of these will be discussed below. This invention also contemplates a continuous improvement process whereby the system resident software can be updated wirelessly from the Internet as additional information regarding crash analysis is obtained.

Although GPS is used in this specification, it is to be understood that any navigational GNSS satellites can be used including Glonass, Galileo and others.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 5 is a table showing various variants of the accelerometer and gyro calibration system.

DETAILED DESCRIPTION OF THE INVENTION

1. Introduction

Figure 1:
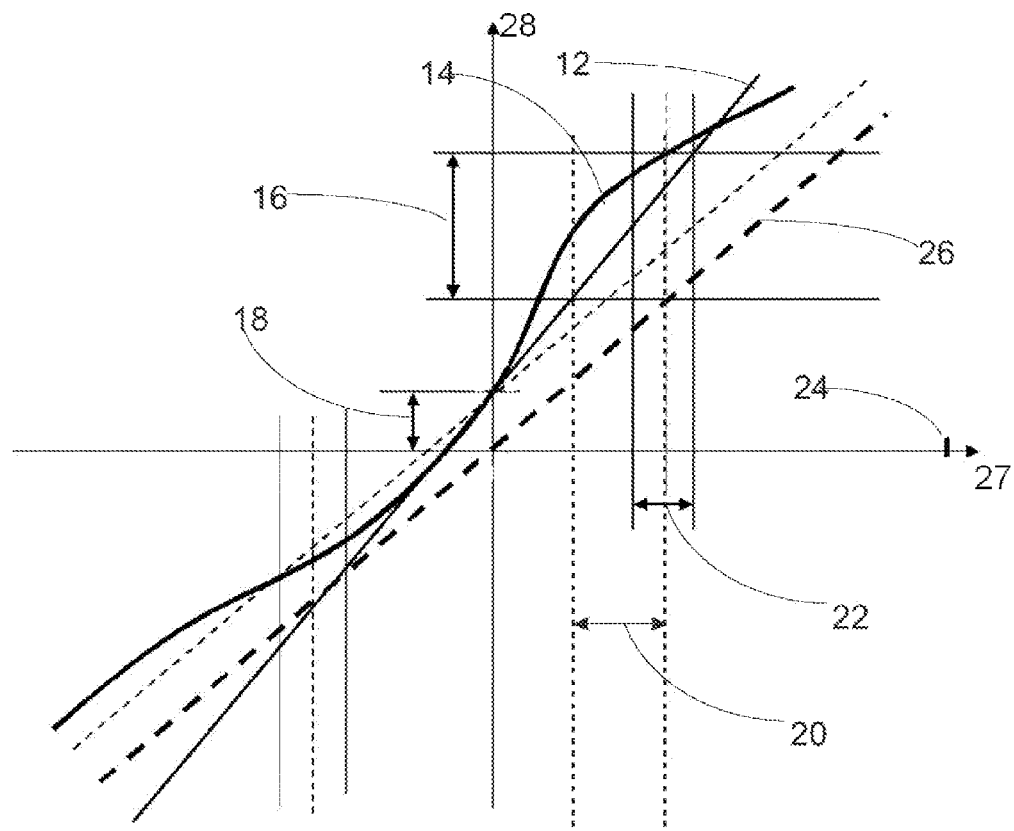
FIG. 1 is a graph illustrating errors in an accelerometer.

An object of the present invention is to provide an IMU crash and rollover sensor. To do this, the basic engineering solutions for a GPS-corrected IMU crash and rollover sensor primarily for low-price mass produced cars is presented herein. This objective is accomplished by:

1) Using the Airbag lumped control circuit, the airbag ECU, comprising a control system with an inertial measurement unit, IMU, mounted at a central sensing point instead of the currently widely used distributed sensors and circuit for mounting crash sensors at the expected impact points of the vehicle. This currently standard system involves expensive and unreliable communication lines and connectors for transmitting signals to the central decision-making unit.

2) Manufacturing IMUs in accordance with the mass-production MEMS technology at a cost of a few dollars per unit. An IMU can comprise 3 accelerometers and 3 gyroscopes or more generally, a plurality of accelerometers and/or a plurality of gyroscopes.

3) Replacing the expensive, currently in-use self-calibration system for the correction of the changing errors in the sensor parameters and applying a procedure for re-calibration of IMU gyroscopes and accelerometers with the help of GPS signals. The cost of a GPS sensor is also a few dollars per unit.

4) Additionally, optionally using the zero lateral and vertical speed of the vehicle, as well as speedometer and odometer readings for IMU calibration.

5) Additionally, optionally correcting the projections of gravitational acceleration in accelerometer readings, when the vehicle tilts, and centrifugal accelerations during turning maneuvers, and, correspondingly, a lesser ambiguity in detecting the moment of crash.

6) Additionally, optionally extending the capabilities of the airbag ECU for the detection of a side and rear impact by way of transmitting forces from the impact area to the sensing point, with minor changes made to the vehicle structural design.

2. Specifications of the System for Detecting Accidents

Preferred specifications for an exemplifying, non-limiting system for detecting accidents in accordance with one embodiment of the invention are as follows:

1) The airbag system must operate at a vehicle speed and crash impact speed of more than 30 MPH (48 KPH).

2) A crash typically involves a change in the vehicle speed of about 2 MPH (0.89 m/s) in about 20 ms, which corresponds to the acceleration A=0.89/0.02=44.5 m/s$^2$=4.52 g.

3) An allowable measurement error is assumed to be about 5%, which is equal to dA(3σ)=0.05*4.52 g=0.226 g, dA(1σ)=0.075 g.

4) A maximum longitudinal slope of a highway and city (V<100 km/hour) road is about 5% (2.86 degrees), which corresponds to a horizontal projection of acceleration of 0.05 g. The cross slope of a road is 2.5% (1.43 degrees) corresponds to a horizontal projection of acceleration of 0.025 g.

5) Expected values for additional sources of the vehicle tilt with respect to the horizontal plane are as follows:
  oscillations are <about 5 degrees;
  uneven tire pressure is <about 1 degrees;
  non-uniform load is <about 2 degrees;
  uneven rigidity of shock absorbers is <about 1 degree;
  a manufacturing error in the accelerometer sensitivity axis orientation with respect to the car horizontal axis is <about 1 degrees.

Considering that road slopes and vehicle tilts have random independent values, the average maximum slope of the accelerometer axis of sensitivity with respect to a horizon plane can be obtained as:

$$Aa = (2.86^2 + 5^2 + 1^2 + 2^2 + 1^2 + 1^2)^{1/2} = 6.4 \text{ degrees.}$$

The projection of the vertical acceleration onto the accelerometer axis of sensitivity due to the longitudinal slope is $Ah = g \sin 6.4° = 0.11$ g, which is equivalent to the half of the allowable error in the measurement of the accident moment $dA(3\sigma)$, even without considering the accelerometer errors.

Figure 4:
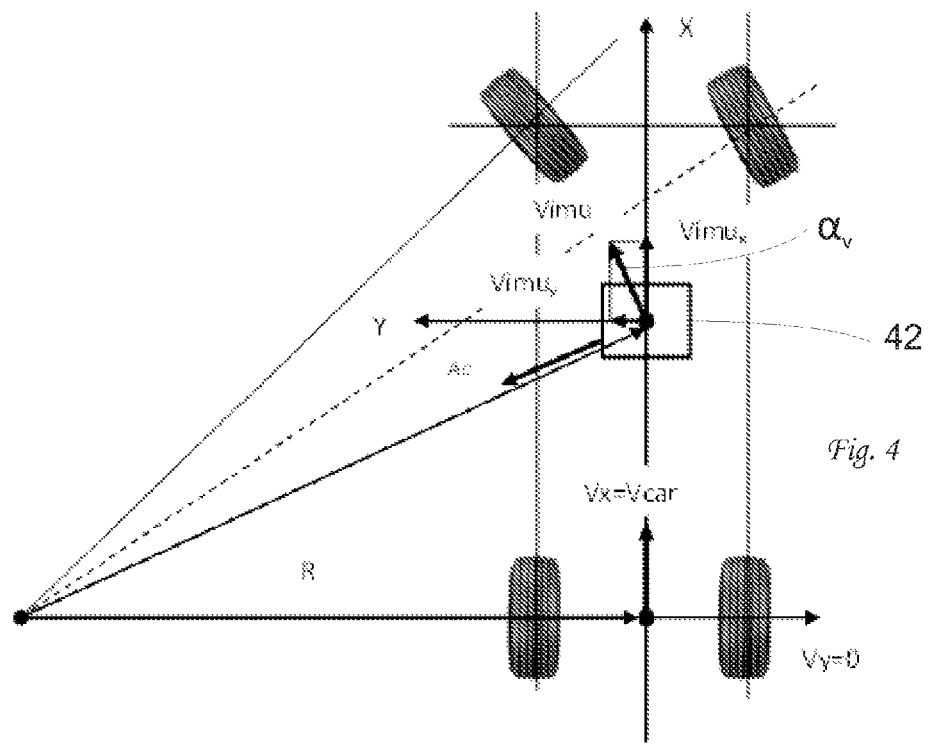
FIG. 4 is a diagram showing various vehicle and IMU velocities.

6) A speed vector deviation from a longitudinal axis of the vehicle during a turning maneuver (FIG. 4) is of the order of $\alpha_V$=about 1 degree (V=30 MPH, the lateral acceleration is about 0.1 g, the turning radius is about 180 M, the vehicle axle spacing is about 4 M, the sensor is mounted at a distance of about 1 m from the front axle).

Rough estimate of the partial contribution of the errors (1σ) to the crash detection threshold

| Parameter | Allowable measurement error of the linear acceleration | Accelerometer zero shift | Accelerometer scale factor Error | Road longitudinal (cross) slope | Vehicle tilt | Average total measurement error of the linear acceleration |
|---|---|---|---|---|---|---|
| Rated value | 5% | 1 ... 10 mg | 1%* | 5% (2.5%) | 1 deg | — |
| Measurement error in the threshold value of the accident acceleration of 4.52 g | 0.075 g | 0.001 g ... 0.01 g | 0.045 g | 0.05 g (0.025 g) | 0.017 g | 0.07 g |

*For reference, certain specifications of airbag BOSCH accelerometers SMA550 and SMA560 are:
Nonlinearity of Sensitivity: ±2%.
Sensitivity for Range ±35 g: 13 LSB/g (LSB = 0.077 g).

FIG. 1 presents the main errors of the accelerometer, as well as the zones of its parameter calibration and accident acceleration identification. Use of airbag accelerometers presents a number of specific features considered in the Appendix to this specification.

Referring to FIG. 1, a constant scale factor error is illustrated by line 12, the nonlinearity of the scale factor is illustrated by curve 14, the error of the accident is identified at 20, the acceleration error at 16, the acceleration zero shifts at 18, the typical zone of accident identification (4.75±0.075 g) at 22, the accelerometer range at 24 and the ideal characteristics is illustrated by line 26. In FIG. 1, the accelerometer input axis is labeled 27 and the output axis 28.

The error of the accelerometer leads to "false" triggering of the airbag (for small acceleration of the vehicle) or late triggering (at high accelerations), depending on the sign of the error. In both cases, accelerometer error can lead to injury of the occupant. An object of this invention is therefore to reduce the magnitude of the accident identification errors 20 by the calibration and error compensation of the accelerometers and gyroscopes with at least one of the GPS, mileage traveled, zero lateral speed and zero vertical speed.

Conclusions of the Analysis of the Specifications on the Accelerometer Calibration System:

1. The main problem of Airbag accelerometer errors is believed to be the scale factor: its calibration for the accident zone of 4.5 g, using the range of vehicle real accelerations of ±0.1 ... 0.2 g requires a large interpolation.

2. The second most important problem is believed to be the compensation—in accelerometer readings—of the projections of the gravitational acceleration due to the road slopes and vehicle tilts. This value (of about 0.05 g) exceeds its biases by an order of magnitude (by about 0.005 g) and, most probably, is not taken into account in existing Airbag systems. A solution to this problem will be provided herein. Especially as this problem can be solved to a first approximation, by using the tools of the IMU itself (without/with an odometer and/or GPS involved).

3. To solve the problem of accelerometer calibration, the data on speed and displacement obtained from the vehicle regular systems, such as speedometer (odometer) and/or wheel angular speed sensors for ABS, can be used as disclosed herein. In both cases, there is no need to mount additional sensors (only extra communication lines). In so doing, a complete independence of airbag is kept, which is absent in the use of GPS, which depends on the direct radio visibility of the navigation satellites.

4. To solve the accelerometer calibration problem, the equality to zero of the lateral velocity (along the Y-axis of the vehicle—its back axle has no sideslip) and vertical speed (along the Z-axis of the vehicle—it does not lift off the road) are equal to zero can be used. This feature is not used in the existing airbag sensor calibration systems and thus is unique to this invention.

5. It is necessary to compensate the centrifugal component of acceleration of about 0.1 m/s$^2$ in the lateral accelerometer readings, when a vehicle is in curvilinear motion. This can be done using an odometer and a vertical gyro. This is not done in currently available systems and thus is unique to the instant invention.

6. The accelerometer bias is mixed with the projection of the gravitational acceleration onto the accelerometer axis of sensitivity due to vehicle tilts toward the horizontal plane, which makes its calibration more complicated. Therefore, to calibrate accelerometers, it is necessary to solve the problem on the measurement of the roll and pitch angles of the vehicle. A second alternative solution of this problem is their joint calibration and compensation together. A disadvantage of this approach is the circumstance that the vehicle tilts can be changed sufficiently fast, for example, when driving over a speed bump, whereas the drifts of accelerometers are changed sufficiently slowly: the time constant is the clock. The driving over of a speed bump will thus be ignored in the accelerometer calibration.

7. Zero shifts can be calibrated for all three accelerometers. As regards the scale factor, it can be calibrated for the longitudinal accelerometer X within the range accelerations of ±0.2 g. It is difficult to calibrate the scale factor of the lateral accelerometer Y to a high accuracy because of a small change in the lateral acceleration. It is also difficult to calibrate the scale factor of the vertical accelerometer Z to a high accuracy because of a small change in the vertical acceleration. Its calibration together with the zero shift for the acceleration of 1 g is more realistic, which will be useful to improve the accuracy of measuring the vertical acceleration. When the vehicle is stopped, accelerometer zero shifts are not calibrated due to the projection of the gravitational acceleration in the out of level position, which always takes place in practice.

8. Drifts of gyroscopes can be calibrated when the vehicle is both in motion and stopped. As for the scale factors of gyros, only the scale factor of a vertical gyroscope can be actually calibrated since a vehicle has a high angular speed about the vertical axis only. As regards for the lateral and vertical axes, the angular velocities of a vehicle are very low, and errors in the scale factors manifest themselves only slightly and therefore they are not actually calibrated.

9. A variant of the accelerometer calibration system described herein can use, in different ways, the readings of the IMU, odometer, zero lateral and GPS vertical linear velocities. The version involving IMU calibration using GPS readings with/without making use of the zero lateral and vertical velocities can be considered as a main variant. It can be produced by simply eliminating from expressions the components related to the parameters to be excluded from a full version of the system.

10. For any particular application, it is desirable to perform a computer simulation of the selected version of the system (systems), e.g., using MATLAB.

3. Equipment and its Components

Figure 2:
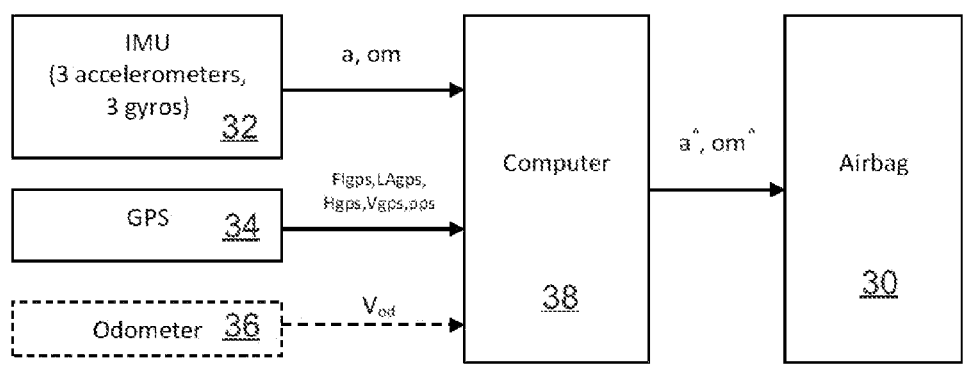
FIG. 2 is a block diagram of a system for calibration and error compensation of the accelerometers in accordance with the invention.

The system of measuring acceleration for accident identification is composed of the following components (FIG. 2):

6-axis IMU (3 gyros, 3 accelerometers) 32,
GPS system or device 34, usually including a receiver with an antenna,
odometer (speedometer or ABS wheel angular speed sensors ABS) 36,
computer 38 (which is coupled to and receives data from the IMU 32, GPS 34 and odometer 36 or other sensor system, and includes typically componentry of a computer such as a processor, memory, and other hardware to execute software which may be incorporated into the memory), and
airbag 30 (which is coupled to and controlled by the computer 38 and generally indicates one or more airbags or airbag systems, or additionally or alternatively other occupant protection devices or systems).

The variables are defined as follows:
a=the 3D vector of accelerometer readings,
om=the 3D vector of gyroscope readings,
Flgps, LAgps, Hgps, Vgps, pps are the GPS readings for the latitude, longitude, altitude, linear velocity vector with respect to the Earth, measuring sync pulse, respectively
Vod=the vehicle speed measured by an odometer'
a^, ω^=refined values for linear acceleration and angular velocity vectors

4. Coordinate Systems

Figure 3:
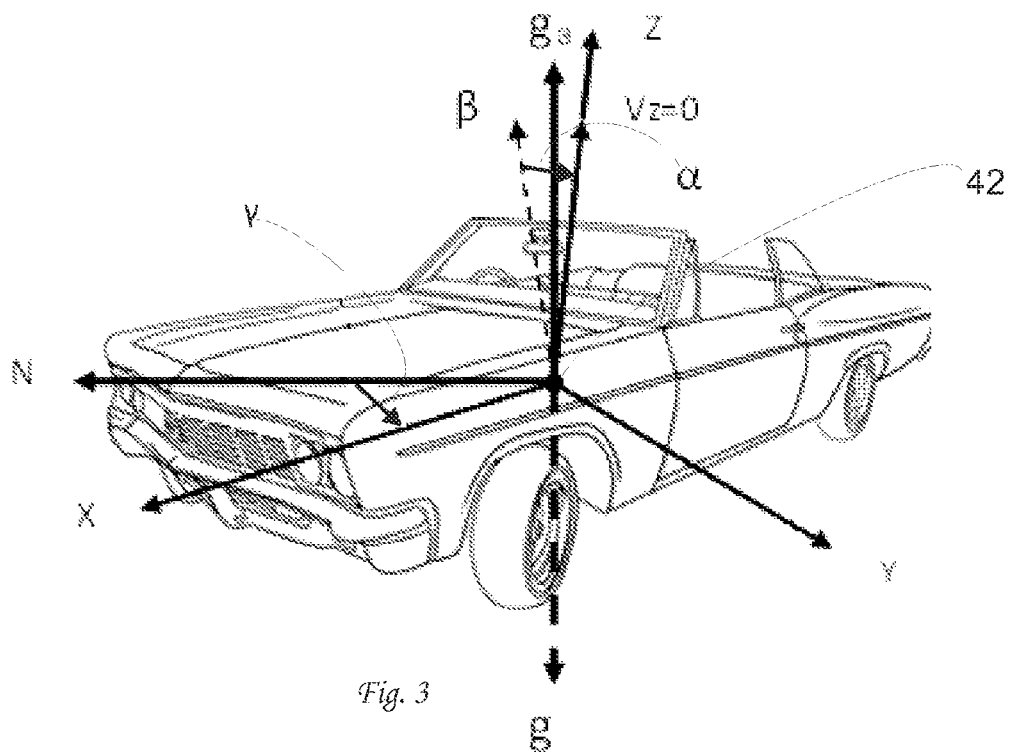
FIG. 3 is the vehicle coordinate system used in the analysis.

The following coordinate systems are used (FIG. 3, FIG. 4):

1) Vehicle fixed coordinate system (VFCS): X-axis is forward, Y-axis is to the left, Z-axis is upward.
2) Horizontal coordinate system (HCS): X-axis points East, Y-axis—North, Z-axis—upward. The IMU is mounted in the vehicle such that the accelerometer axes of sensitivity X, Y, Z coincide, respectively, with the axes of the vehicle fixed coordinate system VFCS)
3) For the vehicle. $\alpha$=Roll, $\beta$=Pitch, $\gamma$=Yaw, $g_a$=−g As follows from FIG. 4, during vehicle turning maneuvers, the accelerometer sensitivity axis X does not coincide with the direction of the vehicle speed vector Vimu at the point of the IMU 42 mounting (the misalignment angle $\alpha_V$).

5. Variants of the Accelerometer Calibration and Error Compensation System

Possible variants of implementation of the accelerometer calibration system are given in the table of FIG. 5.

The difference between the variants is the use of a different number of information sources and the principles of operation for the solution of the accelerometer calibration problem. All the system variants can perform the accelerometer calibration (X, Y, Z), compensation of the projections of the acceleration of the Earth's gravity in accelerometer readings due to the vehicle tilts and compensation of the centripetal acceleration Ac in the lateral accelerometer Y when the vehicle goes along a curvilinear path. All the system variants can employ a re-calibration of gyroscope drifts when the vehicle is stopped, as a supplement to the basic algorithm.

Each system variant has its own advantages and disadvantages.

Figure 10:
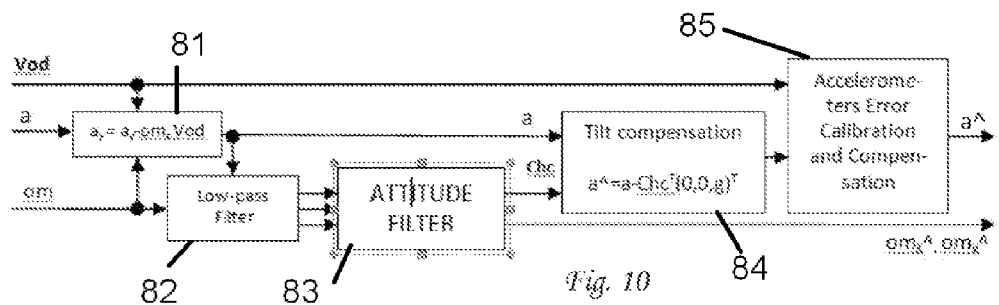
FIG. 10 is a block diagram of a preferred algorithm of the "Minimal" variant of the system.

"Minimal" variant (Variant 3 in the rightmost column) is the simplest variant of the system, whose implementation requires very little computing facilities. The system embodies a simple physical principle of operation: the determination of the roll and pitch angles from projections of acceleration of the Earth's gravity on the IMU-axis using gyroscopes to measure high-frequency oscillations of a vehicle. This is realized by making use of a frequency filter Attitude Filter, which has a unit transfer function in the whole frequency range, smoothes the high-frequency components of accelerometer signals and filters low-frequency drifts of gyroscopes (FIG. 10). At the same time, drifts of gyroscopes are calibrated and compensated. A disadvantage of this filter is the sensitivity of the vertical errors (roll, pitch) to the vehicle vibrations and linear accelerations, which reduces the compensation accuracy for the projections of the acceleration of the Earth's gravity when a vehicle tilts.

The X accelerometer calibration is performed by comparing its readings with those of the odometer. For calibration of the Y and Z accelerometer, the fact is used that the vehicle velocities along the Y and Z axes are equal to zero. Here, to improve the calibration accuracy, the centripetal acceleration Ac occurring when the vehicle travels along a curvilinear path is compensated in the Y accelerometer readings. This acceleration is calculated from the odometer and vertical gyro readings.

"Maximum" variant is the most expensive, most accurate and considered at this time to be a preferred implementation since it can use a large amount of redundant information (GPS+/−Odometer+/−zero lateral and vertical velocities). A Kalman filter, or equivalent, that requires sufficiently large computing power is used to process data.

One drawback of this variant is the dependence on the operability of a GPS, which does not always operate well during the navigation satellite shading of the line of sight (city, mountains, forest, tunnels, etc.) and a great number of reflected signals under city conditions. The GPS antenna should be mounted in the range of direct radio visibility of navigation satellites, which have a communication line between the antenna and IMU. This can reduce the reliability of the system as a whole. However, currently available sensitive GPS systems are inexpensive and can generally use antenna(s) that are collocated or near the mounting location of the IMU, thus eliminating or minimizing the communication line issue.

"Basic" variant is the least expensive candidate for since it does not use a GPS. This system uses data from an odometer (a standard speedometer available in every automotive vehicle, or ABS wheel rotation sensors) and zero values of the vehicle lateral and vertical velocities of a vehicle (a physical feature of an automobile movement available at no cost). The algorithm of the "basic" system variant is a reduced version of the algorithm for the "Maximum" system. That is, all the quantities concerning the GPS signals are eliminated from the "Maximum" algorithm.

6. "Maximal" Variant

Figure 6:
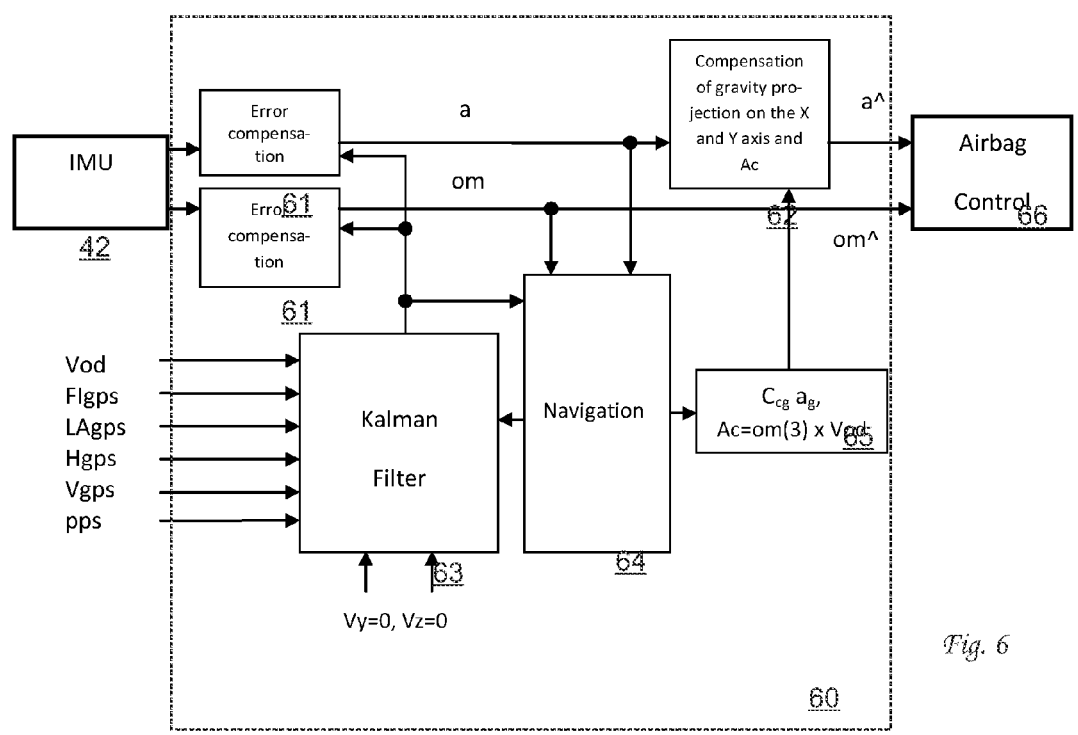
FIG. 6 is a functional diagram of the process of accelerometer and gyro error calibration and compensation. The "Maximal" variant.
Figure 7:
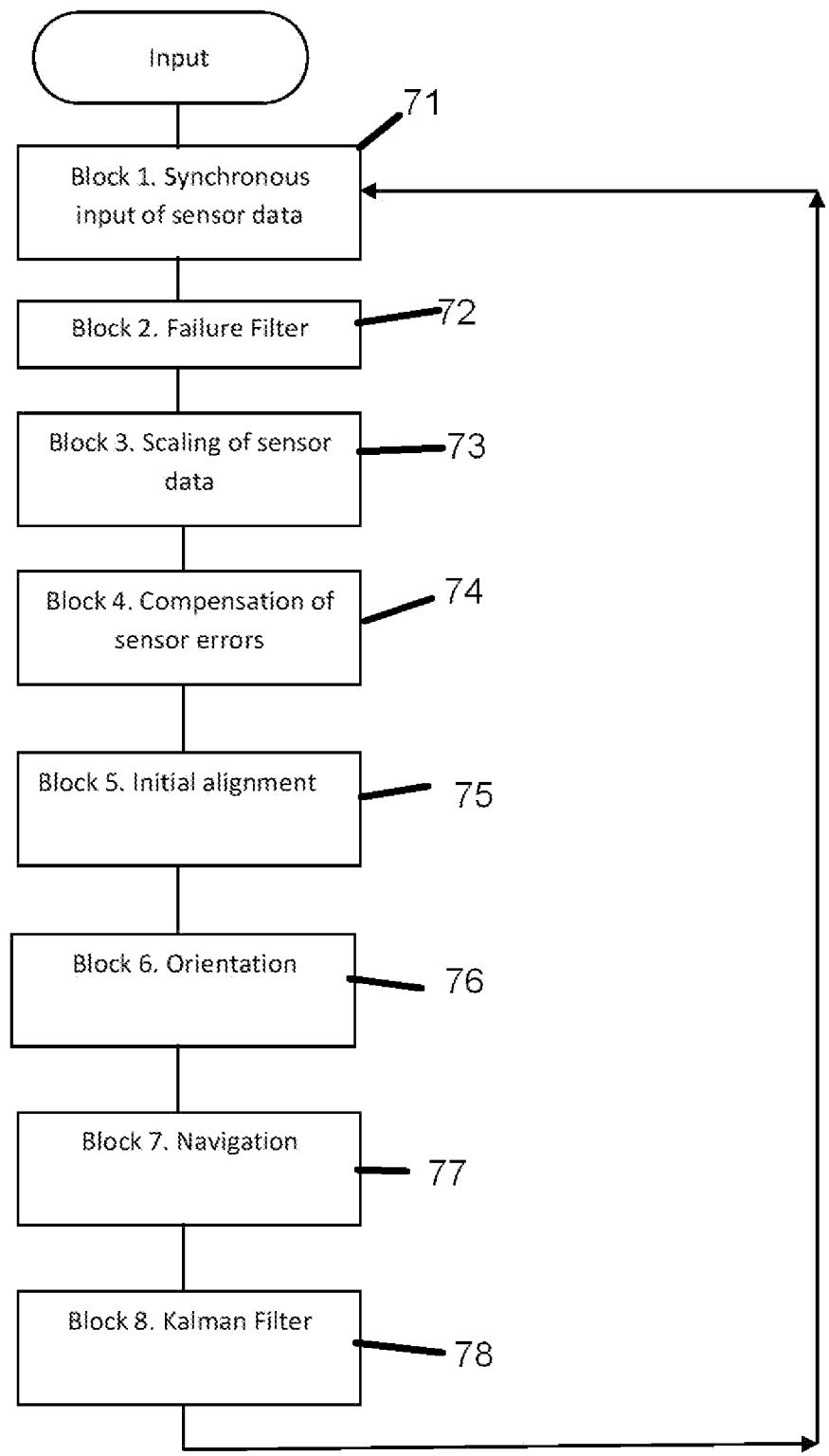
FIG. 7 is a block diagram of an algorithm for calibration and error compensation of the accelerometers and gyros.

A functional diagram of the process of accelerometer error calibration and compensation are presented in FIG. 6, and the algorithm structure is shown in FIG. 7. When the linear acceleration exceeds the preset level (an emergency situation is possible), the compensating circuit is turned off to avoid distortion in accelerometer readings during a potential crash or rollover situation. In order to correct the IMU, the vehicle has a possibility to use the zero lateral and vertical projections of the linear velocity Vy=0, Vz=0 in addition to the GPS signals and a standard speedometer (odometer).

The following is a description of the algorithm structure of FIG. 7 where in data is input at 70.

Block 1. Synchronous Input of Sensor Data, 71

Sensor measurements are made synchronously using a special command sent by a navigation calculator 60 of FIG. 6 over the communication channel. The navigation calculator 60 generates synchronization commands using the sync pulses pps of the GPS receiver 34.

The input of IMU 42 sensor signals into the navigation calculator 60 is performed at Block 1:
1) Gyros(3), [integer] are the angular velocities from 3 gyros at a frequency of 100 . . . 1000 Hz;
2) t0_gyros(3), [integer] is the temperature from 3 gyros at a frequency of 0.1 Hz;
3) Accel(3), [integer] are the linear accelerations from 3 accelerometers at a frequency of 100 . . . 1000 Hz;
4) t0_accel(3), [integer] is the temperature from 3 accelerometers at a frequency of 0.1 Hz.
5) GPS frequency is 1 . . . 5 Hz:
6) Flgps_deg, [grad] —latitude;
7) LAgps_deg, [grad] —longitude;
8) Hgps, [m] —altitude;
9) Vgps=($V_E$, $V_N$, $V_Z$), [m/s] —linear velocity vector;
11) SIG_FILAgps, [grad] —RMS errors of the longitude and latitude;
12) SIG_Hgps, [m] —RMS errors of the altitude;
13) isGPS, [A/B] —indication of GPS measurement validity (A are valid, B are invalid).
14) pps is the GPS sync pulse coming through a separate bus,
15) Odom, [pulse] are the odometer readings.

Block 2. Failure Filter 72

All measurements are tested for validity in order to eliminate the effect of abnormal measurements on the algorithm. However, several very simple and reliable algorithms are most widely used in the practice:

1) All measurements coming to the algorithm are compared with their maximal physical values. In the case where a parameter exceeds the allowable value, it is replaced by its previous value. If this operation is executed three of more times in succession, a notification message such as "Parameter error <parameter name>" is sent to the Decision-making system.

2) All incoming measurements are tested for the change in their values. If the parameter is not changed for more than 10 time steps in succession, a notification message such as "Parameter fault <parameter name>" is output to the "Decision-making system".

3) Measurements of accelerometers, gyroscopes and the odometer, if used, are transferred through the filter 63 which can choose the average value (a median value) from the measurements (usually, three to five) that follow in succession. This nonparametric method makes it possible to determine the estimate of the parameter from its sample values, which is optimal for the minimum of the error module, while ignoring the influence of single abnormal measurements of any level. A single drawback of the median is that it can introduce a lag into the measurement signal of up to the number of time steps equal to the number of the used measurements minus one.

Block 3. Scaling of Sensor Data 73

In this Block, sensor readings (except for GPS readings) are reduced to the physical dimensionality. The expressions for the fulfillment of this operation are dependent on a specific hardware implementation of the data acquisition from sensors. The coefficients needed for this purpose can be stored in the corresponding files.

Moreover, the calibration values of sensor errors (zero shifts, misalignment of the axes of sensitivity) are compensated for in scaling of sensor data block 73. The dependencies of these parameters on the sign of the measured quantity and on the temperature, which is measured by temperature sensors that can be built into the gyros and accelerometers (t0_gyros, t0_accel) are taken into account, when necessary. Error compensation elements 61 perform the error compensation.

The scaling of the vector of accelerometer readings Accel and the compensation of their zero shifts Ao may be:

$$a = \text{diag}(Ka)(\text{Accel} - Ao),$$

where
a is the 3D vector of the scaled-off values of accelerometer readings,
diag(Ka) is the 3×3 matrix, the diagonal elements of which are equal to the scale factors of accelerometers and the rest elements are equal to zero.

The compensation of misalignments of the axes of sensitivity of accelerometers may be:

$$a = Cimu\_a * a,$$

where Cimu_a is the matrix of re-projection of accelerometer readings from the coordinate system related to their axes of sensitivity to the coordinate system related to the IMU.

The scaling of the vector of gyros readings Gyros and compensation of their zero shifts OMo may be:

$$om = \text{diag}(Kg)(\text{Gyros} - OMo),$$

where
om is the 3D vector of scaled off values of gyros readings,
diag(Kg) is the 3×3 matrix, whose diagonal elements are equal to the scale factors of gyros.

The compensation of misalignments of the axes of sensitivity of gyros may be:

$$om = Cimu\_g * om,$$

where Cimu_g—is the matrix of re-projection of gyro readings from the coordinate system related to their axes of sensitivity to the coordinate system related to the IMU.

The scaling of the odometer readings may be:

$$Vod = Kod * Odom,$$

where

Vod is the velocity measured by the odometer,
Kod is the odometer scale factor.

The parameters Ka, Kg, dAo, dOMo, Cimu_a, Cimu_g may be determined during IMU calibration in the production process. The Kod value may be determined by calculation and experimental methods for each car type.

Conversion of GPS readings from degrees to radians is:

$$Flgps = deg\_in\_rad * Flgps\_deg, [rad];$$

$$LAgps = deg\_in\_rad * LAgps\_deg, [rad];$$

$$SIG\_FILAgps = deg\_in\_rad * SIG\_FILAgps, [rad];$$

where deg_in_rad=PI/180.0 is the degree to radian conversion factor.

Block 4. Compensation of Sensor Errors 74

In this Block, the accelerometer and gyro error compensation is performed after the refinement of their scale factor values dKa, dKg and zero shifts dAo, dOMo by the Kalman filter 63

$$a = (E - \text{diag}(dKa))a - dAo,$$

$$om = (E - \text{diag}(dKg))om - dOMo,$$

$$Vod = (1 - dKod) * Odom,$$

where E is the 3×3 unit matrix.

The initial values of dKa, dKg, dAo, dOMo and dKod are equal to zero. Other known techniques to compensate for the accelerometer and gyro error are also envisioned by the inventor for use in the invention.

Block 5. Initial Alignment 75

The GPS receiver measures the vehicle position in the geographic coordinate system. The IMU makes measurements in the vehicle fixed coordinate system. In order for the Kalman filter to operate, it is necessary to reduce the GPS and IMU measurements to the same coordinate system (either a geographical or a vehicle related one). For this purpose, it necessary to know their mutual orientation, which is defined by the matrix Cgc for the re-projection of the vectors from the car-related coordinate system (index "c") into the geographical coordinate system (index "g").

The IMU includes MEMS-based gyros and accelerometers, the accuracy of which is considered to be insufficient for an independent course alignment (determination of the IMU orientation with respect to the North direction). Therefore, at the initial instant of time of the algorithm operation or after a long break in its operation, it is necessary to determine the initial value of the matrix Cgc. For this purpose, either the direction of the velocity vector $$Kgps = a\tan(Vgps(1)/Vgps(2))$$

or the increments of the coordinates Flgps, LAgps can be used. In the both cases, the automotive vehicle should move at a sufficiently high speed since the GPS measures very poorly the velocity and, correspondingly, the course when the car moves slowly. Such is the case for the course measurement from the increment of the coordinates. Since at low speed, the movement is small, the course is determined with a big error. Besides, using the increment of the coordinates, it is possible to determine only the average course in the time of measuring the coordinate increment, which is not generally considered to be appropriate for such a maneuvering vehicle as a car.

Thus, the initial course alignment using Kgps is most suitable for the vehicle speed exceeding a certain predetermined value Vmax (for example, 1 m/s), at which Kgps is determined with sufficient accuracy $$Cgc = [\cos Kgps, -\sin Kgps, 0; \sin Kgps, \cos Kgps, 0; 0,0,1].$$

As for the vertical initial alignment, then the accuracy of MEMS-based accelerometers is sufficient for the solution of this problem with the allowable error by measuring the vector $g_a$ (see the Appendix for more details). However, since the course alignment is performed when the car is in motion, the accelerometer readings are perturbed by its accelerations and the vertical error will be rather large. Moreover, taking into account that the car tilts are sufficiently small (not exceeding about 10 degrees), as initial conditions they can be assumed to be equal to zero with a subsequent refinement during the Kalman filter operation.

The below quaternion used hereinafter in the orientation algorithm corresponds to matrix Cgc $$q(1) = \text{sqrt}(1 + Cgc(1,1) + Cgc(2,2) + Cgc(3,3))/2;$$

$$q(2) = (Cgc(3,2) - Cgc(2,3))/(4*q(1));$$

$$q(3) = (Cgc(1,3) - Cgc(3,1))/(4*q(1));$$

$$q(4) = (Cgc(2,1) - Cgc(1,2))/(4*q(1)).$$

Included in the initial alignment block are also the coordinates related to the start of navigation, with respect to which the increment of the coordinates Flgps0=Flgps, LAgps0=LAgps, Hgps0=Hgps, Vgps0=Vgps is calculated.

The accuracy limitations discussed above for the slow moving vehicle are substantially overcome if the changes in vehicle position as determined by the GPS are accomplished by a comparison of the carrier signal phases at different epochs. Position accuracies on the order millimeters have been achieved by this method which greatly improves the ability to correct the accelerometer errors. The use of multiple antennas spaced as far apart as possible can also be used to greatly improve the gyroscope errors correction. However, the main use of the gyroscopes for this application is for rollover detection where the required accuracy is substantially less.

In such a system for correcting a measured inertial property of a vehicle, which may be integrated into a single unit or dispersed as several units around the vehicle, there is the inertial measurement unit (IMU) 32, a GPS device 34 arranged on the vehicle to obtain a position of the vehicle from a received GPS signal, and a processor (included in computer 38) that is coupled to the IMU 32 and the GPS device 34. The processor in computer 38 is configured to determine an indication of a change in a phase of a carrier frequency of a first GPS signal used by the GPS device 34 at a first time and a second GPS signal used by the GPS device 34 at a second time after the first time. The processor in computer 38 adjusts a determination of an inertial property of the vehicle by the IMU 32 based on the determined change in the phase of the carrier frequency. The position of the vehicle may be obtained at the first and second times using at least three antennas separated from one another by about 1-10 centimeters, which would be part of the GPS device 32. The IMU 32 comprises, in one embodiment, at least one gyroscope such that the inertial property is angular velocity, and may alternatively or additional comprise at least one accelerometer such that the inertial property is acceleration.

Block 6. Orientation 76

The goal of the orientation algorithm is to calculate the quaternion q and orientation matrix Cgc from the gyro readings om. This operation is performed in several steps.

1) Reassignment of variables $$d=q(1); a=q(2); b=q(3); c=q(4);$$

2) Integration of the angular velocity, for example, by the trapezium method $$om1=(om(1,i-1)+om(1,i))/2;$$

$$om2=(om(2,i-1)+om(2,i))/2;$$

$$om3=(om(3,i-1)+om(3,i))/2,$$

where i is the current time step of measurement.

3) Integration of the quaternion, for example, by the first-order algorithm $$d1=(-a*om1-b*om2-c*om3)*T/2;$$

$$a1=(d*om1+b*om3-c*om2)*T/2;$$

$$b1=(d*om2+c*om1-a*om3)*T/2;$$

$$c1=(d*om3+a*om2-b*om1)*T/2;$$

$$q(1)=d+d1; q(2)=a+a1; q(3)=b+b1; q(4)=c+c1,$$

where T is the time interval of data acquisition from gyros.

4) Normalization of the quaternion $$norma=1-0.5*(q(1)^2+q(2)^2+q(3)^2+q(4)^2-1);$$

$$q(1)=q(1)*norma;$$

$$q(2)=q(2)*norma;$$

$$q(3)=q(3)*norma;$$

$$q(4)=q(4)*norma;$$

5) Calculation of the matrix Cgc $$d=q(1); a=q(2); b=q(3); c=q(4);$$

$$Cgc(1,1)=d*d+a*a-b*b-c*c;$$

$$Cgc(1,2)=2*(a*b-d*c);$$

$$Cgc(1,3)=2*(a*c+d*b);$$

$$Cgc(2,1)=2*(a*b+d*c);$$

$$Cgc(2,2)=d*d-a*a+b*b-c*c;$$

$$Cgc(2,3)=2*(b*c-d*a);$$

$$Cgc(3,1)=2*(a*c-d*b);$$

$$Cgc(3,2)=2*(b*c+d*a);$$

$$Cgc(3,3)=d*d-a*a-b*b+c*c.$$

Block 7. Navigation 77

Due to a low precision of MEMS-based gyros and accelerometers, in the solution of the navigation problem, the Earth's rotation and its curvature are neglected. The navigation algorithm supposes the fulfillment of the following operations:

1) Re-projection of accelerometer readings to the geographic coordinate system $$a_{g,i}=Cgc*a_i.$$

2) Compensation of the gravitational acceleration $$a_{g,i}(3)=a_{g,i}(3)-g,$$

where
g=g0·a²·(1+beta·sin² (Flgps0))/(a+Hgps0) is the gravitational acceleration at the start point,
g0=9.81438 M/C²; a=6 378 245 M; beta=0.005317;

3) Integration of the linear velocity, for example, by the trapezium method $$Vg_i=Vg_{i-1}+(a_{g,i-1}+a_{g,i})*T/2,$$

where
i is the current time step of measurement,
T is the time interval of data acquisition from accelerometers.
The initial value of $Vg_{i-1}$ is assumed to be equal to $$Vg_{i-1}=Vgps0.$$

4) Integration of the increment of coordinates, for example, by the trapezium method $$Rg_i=Rg_{i-1}+(Vg_{i-1}+Vg_i)*T/2.$$

The initial value of $Rg_{i-1}=0$.

Block 8. Kalman Filter 78 a) Initial Terms

The Kalman filter is used to correct the IMU with additional data from the GPS, odometer and zero lateral and vertical projections of the vehicle linear velocity.

For the Kalman filter, the initial equations are the Markovian equations describing the dynamics of the vector X(m) of the process to be estimated—INS errors (dynamic equation)

$$X(m)=F(m|m-1)X(m-1)+\xi_x(m), \quad (B8.1)$$

which is written in the analog form as $$dX(t)/dt=FA(t)X(t)+\xi A_x(t), \quad (B8.2)$$

and the linear equation of the vector of observations Y(m) (watch equation)

$$Y(m)=H(m)X(m)+\xi_y(m), \quad (B8.3)$$

where
m is the instant of arrival of the correcting information;
F(m|m−1) is the matrix of dynamics of the process to be estimated (relates the values of the system state vector at the instants of time m and m−1);
ξ(m) is the white noise in the discrete dynamic equation with covariance matrix $G_{\xi x}$;
$\xi A_x(t)$ is the white noise in the analog dynamic equation with covariance matrix $GA_{\xi x}$;
N(m) is the noise effect matrix of the dynamic equation for the process to be estimated;
H(m) is the matrix of observations;
ξy (m) is the white noise in the watch equation with covariance matrix $G_{\xi y}$.
The objective of the Kalman filter is to calculate the estimates X^(m|m) of state vector X(m) (INS errors) from the results of their observations Y(m) (from the vector of observations equal to the difference between the measured auxiliary aids for the parameters Y*(m) and the parameters $Y_{INS}$ measured by INS $$Y(m)=Y_{INS}-Y^*(m),$$

using the filter gain K(m), $$X\char`\^(m|m)=K(m)Y(m). \qquad (B8.4.)$$

The Kalman filter coefficient K(m) is calculated by the formulas $$PR(m)=F(m|m-1)P(m-1)F^T(m|m-1)+G_{\xi x}(m), \qquad (B8.5)$$

$$K(m)=PR(m)H^T(m)[H(m)PR(m)H^T(m)+G_{\xi y}(m)]^{-1}, \qquad (B8.6)$$

$$P(m)=[E-K(m)H(m)]PR(m), \qquad (B8.7)$$

using the matrices F(m|m−1), H(m), $G_{\xi x}$, $G_{\xi y}$.

The matrices F(m|m−1), $G_{\xi x}$ are dependent on the object motion path, therefore they are to be calculated recursively during the period between the arrivals of the correcting information [m−1, m], using the gyro and accelerometer readings (the period of arrival of the correcting information exceeds considerably the period of arrival of gyros and accelerometers). The period of functioning of the Kalman filter can be artificially extended for decorrelization of observation errors, which improves the operation of the Kalman filter. The manner in which the artificial extension is performed is known to those skilled in the art to which this invention pertains, or readily ascertainable from the teachings disclosed herein.

The calculated estimates X^ (m|m) are used for the compensation of INS errors, after which the cycle of the Kalman filter is repeated. Thus, a so-called closed-loop circuit of the Kalman filter connection is realized [additional information about which is disclosed in J. S. Meditch. Stochastic optimal linear estimation and control, McGraw Hill, New York, 1969].

Markovian error models dKa, dAo, dKg, dOMo, dKod are used the filter. In the practice, the First-Order Markov Model with an autocorrelation function are often used $$Kx(\tau)=\sigma_x^2 e^{-|\tau|/Tx}, \qquad (B8.8)$$

where
$\sigma_x^2$ is the variance of the process X,
Tx is the time constant of the process X.

The generating filter specified by the below first-order equation corresponds to autocorrelation function (B8.8)

$$dX/dt=-X/Tx+\xi k, \qquad (B8.9)$$

where ξk is the "white noise" of intensity 2 $\sigma_x^2$.

The measures on the protection against discrepancy of estimates are to be provided in the filter (in particular, the control over the positiveness of the diagonal elements of error estimate covariance matrix P(m|m), the control over the value of discrepancies in measurements Y, a lower bound on the gain factor module of the Kalman filter—all of them can become close to zero, and the filter will cease to take new measurements into account, and so on).

Figure 8:
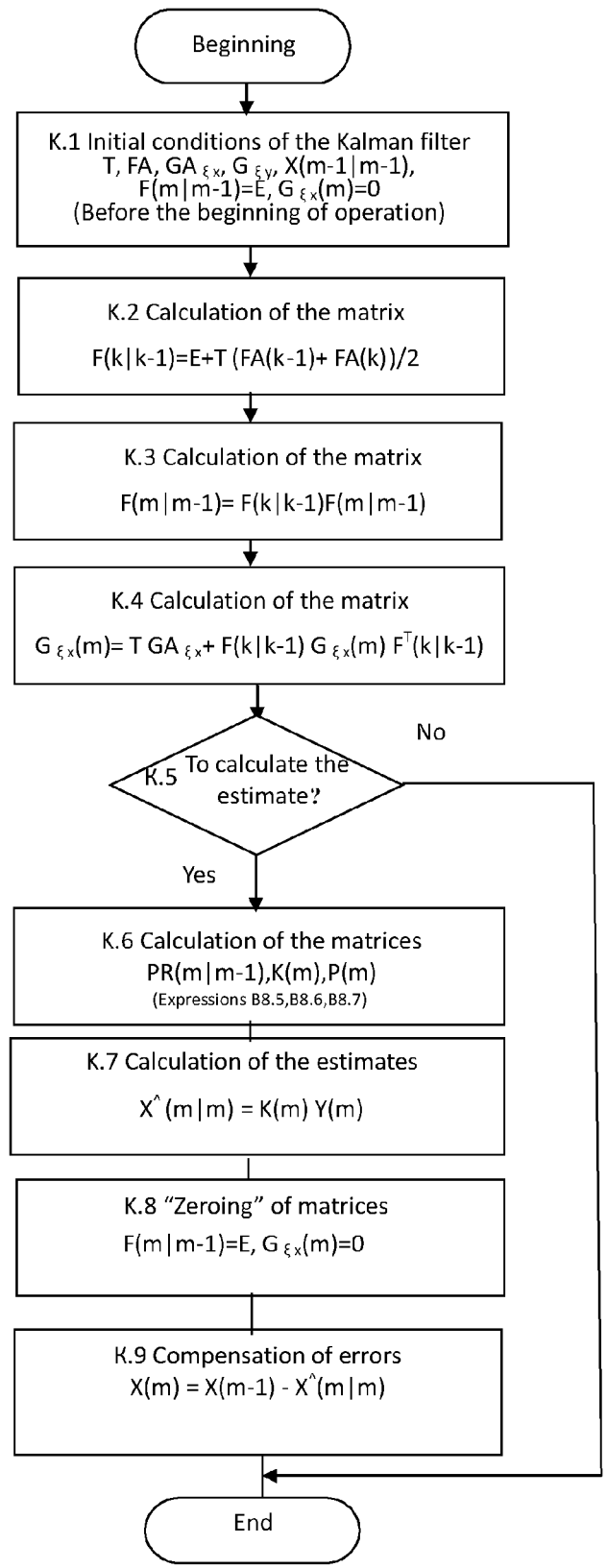
FIG. 8 is a Block diagram of a Kalman filter which can be used herein.

A schematic of interaction between the Kalman filter and the navigation algorithm is shown as 63 and 64 in FIG. 6, and its structural diagram is shown in FIG. 8. The filter is implemented cyclically with the time interval of
[m−1,m].
b) Parameters and Matrices Used in the Kalman Filter
1) State vector of the filter (dimensionality 22)

$$X[22\times 1]=(dVg[1\times 3], dRg[1\times 3], dGAMA[1\times 3], dKa[1\times 3], dAo[1\times 3], dKg[1\times 3], dOMo[1\times 3], dKod)^T,$$

where
dVg is the 3D linear velocity error vector in the geographic coordinate system;
d Rg—3D error vector of increments in linear coordinates with respect to the start point;
dGAMA is the (1×3) error matrix of the IMU angles of orientation with respect to the geographic coordinate system;
dKa—is the (1×3) error matrix of accelerometer scale factors;
dA0—is the (1×3) error matrix of accelerometer zero shifts;
dKg—is the (1×3) error matrix of gyro scale factors;
dOMo—is the (1×3) error matrix of gyro drifts;
dKod—is the error in the odometer scale factor.
2) T is the period of sensing of data from the IMU.
3) FA(22×22) is the matrix of analog dynamic equation (B8.2)
The elements of the matrix FA have the following values:
FA(1,8)=−$a_g$(3); FA(1,9)=$a_g$(2); FA(2,7)=$a_g$(3); FA(2,9)=−$a_g$(1); FA(3,7)=−$a_g$(2); FA(3,8)=$a_g$(1);
FA(i,j)=C(i,j−9), i=1 . . . 3, j=10 . . . 12, where $$C=Cgc*\mathrm{diag}(a),$$

diag (a) is the (3×3) matrix whose diagonal elements are equal to:
diag (1,1)=a(1), diag (2,2)=a(2), diag (3,3)=a(3)), and the rest elements are equal to 0.
FA(i,j)=Cgc(i,j−12), i=1 . . . 3, j=13 . . . 15.
FA(4,1)=FA(5,2)=FA(6,3)=1.
FA(i,j)=C(i−6,j−15), i=7 . . . 9, j=16 . . . 18, where $$C=-Cgc*\mathrm{diag}(om).$$

FA(i,j)=−Cgc (i,j−18), i=7 . . . 9, j=19 . . . 21.
FA(10,10)=FA(11,11)=FA(12,12)=−Tka$^{-1}$.
FA(13,13)=FA(14,14)=FA(15,15)=−Ta0$^{-1}$.
FA(16,16)=FA(17,17)=FA(18,18)=−Tkg$^{-1}$.
FA(19,19)=FA(20,20)=FA(21,21)=−Tg0$^{-1}$.
FA_n (22,22)=−Tod$^{-1}$.
The rest elements of the matrix FA are equal to zero.
4) F(m|m−1) is the (22×22) matrix of discrete dynamic equation of the process to be estimated (it relates the values of system state vector at the instants of time m and m−1).
5) $GA_{\xi x}$ is the (22×22) covariance matrix of noise $\xi A_x(t)$ of the analog dynamic equation for the process to be estimated (8.2)

$$GA_{\xi x}=\mathrm{diag}\{\mathrm{diag}(\sigma_a^2),\mathrm{diag}(\sigma_{dR}^2),\mathrm{diag}(\sigma_g^2),\mathrm{diag}(2\sigma_{Ka}^2/T_{Ka}),\mathrm{diag}(2\sigma_{dAo}^2/T_{dAo}),\mathrm{diag}(2\sigma_{Kg}^2/T_{Kg}),\mathrm{diag}(2\sigma_{OMo}^2/T_{OMo}),2\sigma_{Kod}^2/Tod\},$$

where
diag ($\sigma_a^2$) is the (3×3) matrix whose diagonal elements are equal to the accelerometer noise variance components ($\sigma_a^2=(\sigma_a^2(1), \sigma_a^2(2), \sigma_a^2(3))$;
diag ($\sigma_{dR}^2$) is the (3×3) matrix whose diagonal elements are equal to the error variance components in the calculation of the coordinates $\propto_{dR}^2=(\sigma_{dR}^2(1), \sigma_{dR}^2(2), \sigma_{dR}^2(3))$;
diag ($\sigma_g^2$) is the (3×3) matrix whose diagonal elements are equal to the gyro noise variance components $\sigma_g^2=(\sigma_g^2(1), \sigma_g^2(2), \sigma_g^2(3))$;
diag($2\sigma_{Ka}^2/T_{Ka}$) is the (3×3) matrix whose diagonal elements are equal to the generating filter noise variance in the error model of accelerometer scale factors;

diag($2\sigma_{dAo}^2/T_{dAo}$)—is the (3×3) matrix whose diagonal elements are equal to the generating filter noise variance in the model of accelerometer zero shifts;

diag($2\sigma_{Kg}^2/T_{Kg}$)—the (3×3) matrix whose diagonal elements are equal to the generating filter noise variance in the error model of gyro scale factors;

diag($2\sigma_{OMo}^2/T_{OMo}$)—the (3×3) matrix whose diagonal elements are equal to the generating filter noise variance in the model of gyro zero shifts;

$2\sigma_{dKod}^2/T_{dKod}$—the generating filter noise variance in the error model of the odometer scale factor.

6) Y(m) 9D vector of observations at the instant of time m

Y (1)=Vg(1)−Vgps (1) is the East velocity error;
Y (2)=Vg(2)−Vgps (2) is the North velocity error;
Y (3)=Vg(3)−Vgps (3) is the vertical velocity error;
Y (4)=Rg(1)−Xgps is the East coordinate error;
Y (5)=Rg(2)−Ygps—is the North coordinate error;
Y (6)=Rg(3)−Hgps—is the vertical coordinate error, where Xgps=(LAgps−LAgps0)/R1;

Ygps=(Flgps−Flgps0)/Re;

Re=6371116.0 M is the average Earth radius;
R1=Re*cos(Flgps)—radius of curvature of the Earth by longitude;
Y(7)=Vc(1)−Vod^;
Y(8)=Vc(2);
Y(9)=Vc(3),
where Vc=$Cgc^T$Vg is the car speed vector in the projections to its related coordinate system,
Vod^—time period [m−1,m] average value of the velocity Vod(i) measured by the odometer Note:

The seventh component of the observation vector Y(7) is calculated as a difference between the longitudinal vehicle velocities calculated by the IMU and odometer. A version (more accurate) of determining Y(7) as a difference in the mileage measured by the IMU and odometer. In this case, in the navigation algorithm, it is necessary to calculate the mileage from the IMU readings and make the accumulation of the odometer readings. In each new trip, these parameters are zeroed out.

In the calculation of the observation vector, in order to improve the accuracy, the GPS readings can be reduced to the IMU measurement time using the pulses pps. For this purpose, the time interval $dt_i$ (or the number of time steps) is registered between the instant of arriving pps (the moment of GPS measurements) and the instant of forming the observation vector of the Kalman filter after these GPS measurements have arrived at the IMU through a serial channel. Using this time and GPS readings at several time steps, the GPS signals are reduced to the current time t by way of extrapolation, for example a linear one GPS(t)=GPS($t_i$)+(GPS($t_i$)−GPS($t_{i-1}$))dt/Tgps, where t is the current time,
GPS(t)—GPS readings reduced to the instant of time t;
GPS($t_i$), GPS($t_{i-1}$)—GPS readings at the instants of time $t_i$, $t_{i-1}$;
Tgps is the time interval of data acquisition from the GPS.

Note:

In this section, an observation vector of the maximum size is presented. It can be shortened by using a combination of only a part of the components. For example, the following versions are possible:

IMU calibration only by the GPS longitude and latitude (Y (4), Y (5));
IMU calibration only by the GPS horizontal plane (Y (1), Y (2)) with the odometer Y(7) or without it; etc.

In case of reduction in the observation vector and state vector, the Kalman filter matrices are to be corrected by way of the elimination of the corresponding columns and rows.

7) The (9×22) Matrix H has the Following Elements:

H (1,1)=H_m (2,2)=H_m (3,3)=H_m (4,4)=H_m (5,5)=H_m (6,6)=1;
H(i,j)=$Cgc^T$(i−6,j), i=7 ... 9, j=1 ... 3;
H(i,j)=C(i−6,j−6), i=7 ... 9, j=7 ... 9;

where

C=$Cgc^T$M(Vg),M(Vg)=[0,−Vg(3),Vg(2);Vg(3),0,−Vg(1);−Vg(2),Vg(1);0].

H(7,22)=−Vod.

The rest elements of the matrix H are equal to zero.

8) Matrix Qy

Qy (1,1)=Qy (2,2)=Qy (3,3)=$\eta_{Vgps}^2$ is the error variance in Vgps;

Qy (4,4)=Qy (5,5)=$\sigma_{Fl,LAgps}^2$ is the error variance in longitude and latitude of GPS (dimensionality is $m^2$);

Qy (6,6)=$\sigma_{Hgps}^2$ is the error variance in altitude of the GPS;

Qy (7,7)=$\sigma_{Vod}^2$—is the error variance in the odometer velocity;

Qy (8,8)=$\sigma_{Vy}^2$—is the error variance in the equality to zero of the vehicle lateral velocity;

Qy (9,9)=$\sigma_{Vz}^2$—is the error variance in the equality to zero of the vehicle vertical velocity.

c) Block K.9 (FIG. 8). Error Compensation

Let X^=X^ (m|m) denote the vector of estimates.

K.9.1) Velocity correction

Vg(1)=Vg(1)−X^(1);

Vg(2)=Vg(2)−X^(2);

Vg(3)=Vg(3)−X^(3).

K.9.2) Coordinate correction

Rg(1)=Rg(1)−X^(4);

Rg(2)=Rg(2)−X^(5);

Rg(3)=Rg(3)−X^(6).

K.9.3) Correction of the orientation matrix Cgc

M(1,2)=1.0;M(1,2)=X^(9);M(1,3)=−X^(8);

M(2,1)=−X^(9);M(2,2)=1.0;M(2,3)=X^(7);

M(3,1)=X^(8);M(3,2)=−X^(7);M(3,3)=1.0;

Cgc=M*Cgc.

K.9.4) Correction of the accelerometer scale factors dKa(1)=dKa(1)+X^(10);

dKa(2)=dKa(2)+X^(11);

dKa(3)=dKa(3)+X^(12).

K.9.5) Correction of the accelerometer zero shifts dAo(1)=dAo(1)+X^(13);

dAo(2)=dAo(2)+X^(14);

dAo(3)=dAo(3)+X^(15).

K.9.6) Correction of the gyro scale factors $$dKom(1)=dKom(1)+X\hat{\ }(16);$$

$$dKom(2)=dKom(2)+X\hat{\ }(17);$$

$$dKom(3)=dKom(3)+X\hat{\ }(18).$$

K.9.7) Correction of the gyro drifts $$dOMo(1)=dOMo(1)+X\hat{\ }(19);$$

$$dOMo(2)=dOMo(2)+X\hat{\ }(20);$$

$$dOMo(3)=dOMo(3)+X\hat{\ }(21).$$

K.9.8) Correction of the odometer scale factor $$dKod=dKod+X\hat{\ }(22).$$

K.9.9) The IMU output parameters arriving at the Airbag control 66 a^=Cgc$^T$a$_g$(ИЛИ a^=a−Cgc$^T$(0;0;g)) is the compensation of the acceleration projection g$_a$ due to the tilt of the IMU;

a^(2)=a^(2)−om(3) Vc(1) is the compensation of centrifugal acceleration, where $$Vc=Cgc^T V_g;$$

$$om\hat{\ }=om.$$

7. "Basic" Variant

The algorithm of the "Basic" system variant is a reduced version of that of the "Maximum" system. That is, all the quantities concerning GPS signals are eliminated from the "Maximum" algorithm. Therefore, the description of the "Basic" algorithm contains many elements repeated in the description of the "Maximum" algorithm. This has been done for the purpose of considering Section 7 separately from Section 6.

Figure 9:
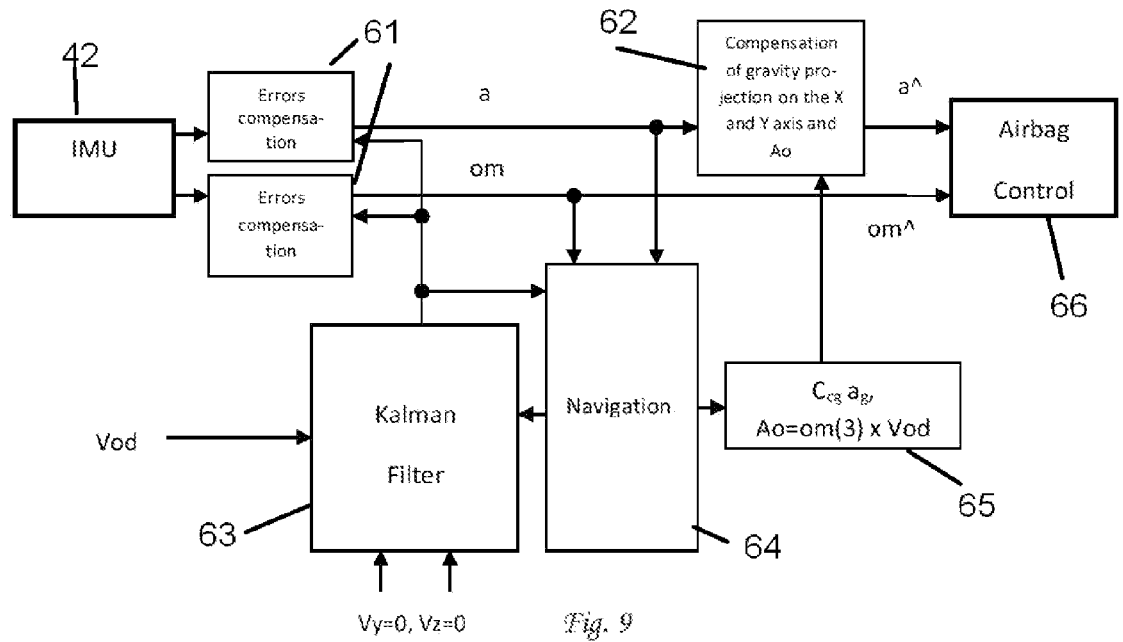
FIG. 9 is a functional diagram of accelerometer and gyro error calibration and compensation "Basic" Variant.

A functional diagram of the process of accelerometer error calibration and compensation is presented in FIG. 9 and the algorithm structure is shown in FIG. 7. When the linear acceleration exceeds the preset level (an emergency situation is possible), the compensating circuit is turned off to avoid distortion in accelerometer readings during emergency. In order to correct IMU, signals of a standard speedometer (an odometer or the ABS wheel angular velocity sensors) and the zero lateral and vertical projections of the linear velocity Vy=0, Vz=0 are used.

Block 1. Synchronous Input of Sensor Data (is Similar to Block 1 of the "Maximal" Algorithm) 71

Measurements by sensors are made synchronously by a special command transmitted by the navigation calculator through a communication channel.

The input of pickup signals of the IMU sensors 42 into the navigation calculator is carried out in Block 1:

1) Gyros(3), [integer]—angular velocities from 3 gyros at a frequency of 100 . . . 1000 Hz;
2) t0_gyros(3), [integer]—temperature of 3 gyros at a frequency of 0.1 Hz;
3) Accel(3), [integer]—linear accelerations from 3 accelerometers at a frequency of 100 . . . 1000 Hz;
4) t0_accel_n(3), [integer]—temperature of 3 accelerometers at a frequency of 0.1 FLA.
5) Odom, [pulse]—odometer readings.

Block 2. Failure Filter (is Similar to Block 2 of the "Maximal" Algorithm) 72

All measurements are tested for validity in order to eliminate the effect of abnormal measurements on the algorithm. However, several very simple and reliable algorithms are most widely used in the practice:

1) All measurements coming to the algorithm are compared with their maximal physical values. In the case where a parameter exceeds the allowable value, it is replaced by its previous value. If this operation is executed three of more times in succession, a notification message such as "Parameter error <parameter name>" is sent to the Decision-making system.

2) All coming measurements are tested for the change in their values. If the parameter is not changed for more than 10 time steps in succession, a notification message such as "Parameter fault <parameter name>" is output to the "Decision-making system".

3) The measurements of accelerometers, a gyroscope and an odometer are transferred through the filter which chooses the average value (a median value) from the measurements (usually, three or five) that follow in succession. This non-parametric method makes it possible to determine the estimate of the parameter from its sample values, which is optimal for the minimum of the error module, while ignoring the influence of single abnormal measurements of any level. A single drawback of the median is that it can introduce a lag into the measurement signal of up to the number of time steps equal to the number of the used measurements minus one.

Block 3. Scaling of Sensor Data (is Similar to Block 3 of the "Maximal" Algorithm) 73

In this Block, sensor readings (except for the GPS readings) are reduced to the physical dimensionality. The expressions for the fulfillment of this operation are dependent on a specific hardware implementation of the sensing of data from sensors. The coefficients needed for this purpose can be stored in corresponding files.

Moreover, the calibration values of sensor errors (zero shifts, misalignment of the axes of sensitivity) are compensated in their readings. The dependences of these parameters on the sign of the measured quantity and on the temperature, which is measured by heat sensors which can be built into gyros and accelerometers (t0_gyros, t0_accel) are taken into account when necessary.

The scaling of the vector of accelerometer readings Accel and the compensation of their zero shifts Ao may be expressed as:

$$a=\mathrm{diag}(Ka)(\mathrm{Accel}-A0),$$

where a is the 3D vector of the scaled-off values of accelerometer readings,
diag(Ka) is the 3×3 matrix, the diagonal elements of which are equal to the scale factors of accelerometers and the rest elements are equal to zero.

The compensation of misalignments of the axes of sensitivity of accelerometers may be expressed as:

$$a=Cimu\_a*a,$$

where Cimu_a is the matrix of re-projection of accelerometer readings from the coordinate system related to their axes of sensitivity to the coordinate system related to the IMU.

The scaling of the vector of gyros readings Gyros and compensation of their zero shifts OMo may be expressed as:

$$om=\mathrm{diag}(Kg)(\mathrm{Gyros}-OMo),$$

where om is the 3D vector of scaled off values of gyros readings,
diag(Kg) is the 3×3 matrix, whose diagonal elements are equal to the scale factors of gyros.

The compensation of misalignments of the axes of sensitivity of gyros may be expressed as:

$$om = Cimu\_g * om,$$

where Cimu_g—is the matrix of re-projection of gyro readings from the coordinate system related to their axes of sensitivity to the coordinate system related to the IMU.

The scaling of the odometer readings may be expressed as:

$$Vod = Kod * Odom,$$

Where
Vod is the velocity measured by the odometer,
Kod is the odometer scale factor.

The parameters Ka, Kg, dAo, dOMo, Cimu_a, Cimu_g are determined during IMU calibration in the production process. The Kod value is determined by calculation and experimental methods for each car type.

Block 4. Compensation of Sensor Errors (is Similar to Block 4 of the "Maximal" Algorithm) 74

In this Block, the accelerometer and gyro error compensation is performed after the refinement of their scale factor values dKa, dKg and zero shifts dAo, dOMo by the Kalman filter $$a = (E - \mathrm{diag}(dKa))a - dAo, \quad om = (E - \mathrm{diag}(dKg))om - dOMo,$$
$$Vod = (1 - dKod) * Odom,$$

where E is the 3×3 unit matrix.

The initial values of dKa, dKg, dAo, dOMo and dKod are equal to zero. During the filter operation, they are refined in Block 10.

Block 5. Initial Alignment 75

In the "Basic" configuration, the accelerometer calibration system cannot determine by itself and store the North direction, therefore, the IMU orientation at the instant of the filter switching-on is taken as a reference (zero) direction, and the initial value of the matrix Cgc is taken equal to the unit matrix Cgc=E.

Block 6. Orientation (is Similar to Block 6 of the "Maximal" Algorithm) 76

The goal of the orientation algorithm is to calculate the quaternion q and the orientation matrix Cgc from the gyro readings om. This operation is performed in several steps.

1) Reassignment of variables $$d = q(1); a = q(2); b = q(3); c = q(4);$$

2) Integration of the angular velocity, for example, by the trapezium method $$om1 = (om(1, i-1) + om(1, i))/2;$$
$$om2 = (om(2, i-1) + om(2, i))/2;$$
$$om3 = (om(3, i-1) + om(3, i))/2,$$

where i is the current time step of measurement.

3) Integration of the quaternion, for example, by the first-order algorithm $$d1 = (-a * om1 - b * om2 - c * om3) * T/2;$$
$$a1 = (d * om1 + b * om3 - c * om2) * T/2;$$
$$b1 = (d * om2 + c * om1 - a * om3) * T/2;$$
$$c1 = (d * om3 + a * om2 - b * om1) * T/2;$$
$$q(1) = d + d1; q(2) = a + a1; q(3) = b + b1; q(4) = c + c1,$$

where T is the time interval of data acquisition from gyros.

4) Normalization of the quaternion $$norma = 1 - 0.5 * (q(1)^2 + q(2)^2 + q(3)^2 + q(4)^2 - 1);$$
$$q(1) = q(1) * norma;$$
$$q(2) = q(2) * norma;$$
$$q(3) = q(3) * norma;$$
$$q(4) = q(4) * norma;$$

5) Calculation of the matrix Cgc $$d = q(1); a = q(2); b = q(3); c = q(4);$$
$$Cgc(1,1) = d*d + a*a - b*b - c*c;$$
$$Cgc(1,2) = 2*(a*b - d*c);$$
$$Cgc(1,3) = 2*(a*c + d*b);$$
$$Cgc(2,1) = 2*(a*b + d*c);$$
$$Cgc(2,2) = d*d - a*a + b*b - c*c;$$
$$Cgc(2,3) = 2*(b*c - d*a);$$
$$Cgc(3,1) = 2*(a*c - d*b);$$
$$Cgc(3,2) = 2*(b*c + d*a);$$
$$Cgc(3,3) = d*d - a*a - b*b + c*c.$$

Block 7. Navigation (is Similar to Block 7 of the "Maximal" Algorithm) 77

Due to a low precision of MEMS-based gyros and accelerometers, in the solution of the navigation problem, the Earth's rotation and its curvature are neglected. The navigation algorithm supposes the fulfillment of the following operations:

1) Re-projection of accelerometer readings to the geographic coordinate system $$a_{g,i} = Cgc * a_i.$$

2) Compensation of the gravitational acceleration $$a_{g,i}(3) = a_{g,i}(3) - g,$$

where
$g = g0 \cdot a^2 \cdot (1 + \mathrm{beta} \cdot \sin^2(\mathrm{Flgps0}))/(a + \mathrm{Hgps0})$ is the gravitational acceleration at the start point,
$g0 = 9.81438$ м/с²; $a = 6\,378\,245$ м; beta=0.005317;

3) Integration of the linear velocity, for example, by the trapezium method $$Vg_i = Vg_{i-1} + (a_{g,i-1} + \sigma_{g,i}) * T/2,$$

where
i is the current time step of measurement,
T is the time interval of the sensing of data from accelerometers.

The initial value of $Vg_{i-1}$ is taken equal to $$Vg_{i-1} = (Vod0, 0, 0)^T,$$

where Vod0 are the odometer readings at the moment of switching the filter "on".

Block 8. Kalman Filter 78

The terms of the Kalman filter are similar to the ones described in the "Maximal" algorithm and differ only in the elimination from the matrices the GPS-related elements which are not in use.

a) Parameters and matrices used in the Kalman filter (K.1, K.2, K.3, K.4 in FIG. 8)

1) Filter state vector $$X[16 \times 1] = (dVg[1 \times 3], dGAMA[1 \times 3], dKa(1), dKa(2),$$
$$dAo[1 \times 3], dKg(3), dOMo[1 \times 3], dKod)^T,$$

where dVg is the 3-dimensional linear velocity error vector in the geographic coordinate system;

dGAMA is the (1×3) error matrix of the IMU angles of orientation with respect to the geographic coordinate system;

dKa—is the (1×3) error matrix of accelerometer scale factors;

dA0—is the (1×3) error matrix of accelerometer zero shifts;

dKg—is the (1×3) error matrix of gyro scale factors;

dOMo—is the (1×3) error matrix of gyro drifts;

dKod—is the error in the odometer scale factor.

Notes: a) The scale factor of dKa(2) of the lateral accelerometer Y is calibrated by the centripetal acceleration ($om_z \times V$), which occurs only during the vehicle curvilinear motion and is substantially parallel to the road bed. Taking into account that to ensure comfort of vehicle passengers, roads are designed with a lateral tilt such that, when the vehicle is in motion at the rated speed, the gravitational acceleration together with the centrifugal acceleration is perpendicular to the road plane. Therefore, the test signal for calibration of dKa(2) is small, which can result in large errors of its calibration. In this connection, dKa(2) can be eliminated from the state vector X.

b) The zero shift of the vertical accelerometer is calibrated together with the error in the scale factor dAo(3)^=dAo(3)+dKa(3) g due to small vertical accelerations of the vehicle. In principle, this does not present serious problems because the component dKa(3) g is approximately constant all the time and behaves itself as a zero shift. Therefore, its compensation together with dAo(3) will result in the system accuracy enhancement.

c) The scale factors of dKg(1), dKg(2) of gyros X and Y are not calibrated since the vehicle angular velocities about the horizontal axes are very small.

d) The course error of dGAMA(3) is estimated with respect to the nominal initial course at the beginning of the filter operation. Therefore, the error in the course is relative and increases in time due to the accumulation of the calibration errors.

2) T is the time interval of data acquisition from the IMU.

3) FA[16×16] is the matrix of the analog dynamic equation
The matrix FA elements have the following values:
FA(1,5)=$-a_g(3)$;  FA(1,6)=$a_g(2)$;  FA(2,4)=$a_g(3)$;
FA(2,6)=$-a_g(1)$; FA(3,4)=$-a_g(2)$; FA(3,5)=$a_g(1)$;
FA(i,j)=C(i,j−9), i=1 ... 3, j=7,8;
where $$C = Cgc * \text{diag}(a),$$

diag (a is the (3×3) matrix whose diagonal elements are equal to:
diag (1,1)=$a_g(1)$, diag (2,2)=$a(2)$, diag (3,3)=$a(3)$), and the rest elements are equal to 0.
FA(i,j)=Cgc(i,j−8), i=1 ... 3, j=9 ... 11.
FA (i,12)=C(i−3,3), i=4 ... 6, where $$C = -Cgc * \text{diag}(om).$$

FA (i,j)=−Cgc (i−3,j−12), i=4 ... 6, j=13 ... 15.
FA(7,7)=FA(8,8)=$-Tka^{-1}$.
FA(9,9)=FA(10,10)=FA(11,11)=$-Ta0^{-1}$.
FA(12,12)=$-Tkg^{-1}$.
FA(13,13)=FA(14,14)=FA(15,15)=$-Tg0^{-1}$.
FA_n (16,16)=$-Tod^{-1}$.

The rest elements of the matrix FA pa$_{BHb1}$ (IS THIS CORRECT?) are equal to zero.

4) F(m|m−1) is the (16×16) matrix of dynamics of the process to be estimated (it relates values of the system state vectors at the instants of time m and m−1).

5) $GA_{\xi x}$ is the (16×16) covariance matrix of noise $\xi A_x(t)$ for the analog dynamic equation of the process to be estimated (8.2)

$$GA_{\xi x} = \text{diag}\{\text{diag}(\sigma_a^2), \text{diag}(\sigma_g^2), 2\sigma_{Ka}^2/T_{Ka}, 2\sigma_{Ka}^2/T_{Ka}, \text{diag}(2\sigma_{dAo}^2/T_{dAo}), 2\sigma_{Kg}^2/T_{Kg}, \text{diag}(2\sigma_{OMo}^2/T_{OMo}), 2\sigma_{Kod}^2/Tod\},$$

Where:

diag($\sigma_a^2$) is the (3×3) matrix whose diagonal elements are equal to the accelerometer noise variance components $\sigma_a^2=(\sigma_a^2(1), \sigma_a^2(2), \sigma_a^2(3))$;

diag ($\sigma_g^2$) is the (3×3) matrix whose diagonal elements are equal to the gyro noise variance components $\sigma_g^2=(\sigma_g^2(1), \sigma_g^2(2), \sigma_g^2(3))$;

$2\sigma_{Ka}^2/T_{Ka}$ is the generating filter noise variance in the error model of accelerometer scale factors X and Y;

diag($2\sigma_{dAo}^2/T_{dAo}$ is the (3×3) matrix whose diagonal elements are equal to the generating filter noise variance in the model of accelerometer zero shifts; $2\sigma_{Kg}^2/T_{Kg}$ is the generating filter noise variance in the error model of the gyro scale factor Z;

diag($2\sigma_{OMo}^2/T_{OMo}$ is the (3×3) matrix whose diagonal elements are equal to the generating filter noise variance in the model of gyro shifts;

$2\sigma_{dKod}^2/T_{dKod}$ is the generating filter noise variance in the error model of the odometer scale factor.

6) Y(m)=3-dimensional observation vector at the instant of time m

Y(1)=Vc(1)−Vod^;

Y(2)=Vc(2);

Y(3)=Vc(3), where Vc=$Cgc^T$Vg is the velocity vector of the car in the projections onto its related coordinate system, Vod^is the time period [m−1,m] average value of the velocity Vod(i) measured by the odometer.

Note:

The first component of the observation vector Y(1) as calculated as a difference in the longitudinal velocity of the car obtained by the IMU and odometer. An alternative way of determining Y(1) as a difference in the mileage measured by the IMU and odometer is possible. In this case, in the navigation algorithm, it is necessary to calculate the car mileage from the IMU readings.

Whenever algorithms are mentioned herein, it is understood by those skilled in the art that the manner in which the algorithms may be accessed and executed is by means of any available technique. For example, the algorithms may be incorporated into or executed by a processor of, for example, a computer, and they may be written into a memory component, embodied as software in a memory component. They may be embodied in non-transitory storage media.

7) The (3×16) matrix H has the following elements:
H(i,j)=$Cgc^T$(i,j), i=1 ... 3, j=1 ... 3;
H(i,j)=C(i−3,j−3), i=1 ... 3, j=4 ... 6;

where $$C = Cgc^T M(Vg), M(Vg) = [0, -Vg(3), Vg(2); Vg(3), 0, -Vg(1); -Vg(2), Vg(1); 0].$$

H(1,16)=−Vod.

The rest elements of the matrix H are equal to zero.

8) The Matrix Qy $Qy(1,1)=\sigma_{Vod}^2$ is the error variance in the odometer velocity;

$Qy(2,2)=\sigma_{Vy}^2$ is the error variance in the equality to zero of the vehicle lateral velocity;

$Qy(3,3)=\sigma_{Vz}^2$ is the error variance in the equality to zero of the vehicle vertical velocity.

The rest elements of the matrix Qy are equal to zero.

b) Block K.9 (FIG. 8). Error Compensation

Let $X\hat{}=X\hat{}$ (m|m) denote the vector of estimates (derived in stage K.7).

K9.1) Velocity correction $Vg(1)=Vg(1)-X\hat{}(1);$ $Vg(2)=Vg(2)-X\hat{}(2);$ $Vg(3)=Vg(3)-X\hat{}(3).$ K9.2) Correction of the orientation matrix Cgc $M(1,2)=1.0; M(1,2)=X\hat{}(6); M(1,3)=-X\hat{}(5);$ $M(2,1)=-X\hat{}(6); M(2,2)=1.0; M(2,3)=X\hat{}(4);$ $M(3,1)=X\hat{}(5); M(3,2)=-X\hat{}(4); M(3,3)=1.0;$ $Cgc=M*Cgc;$ K9.3) Correction of the accelerometer scale factors $dKa(1)=dKa(1)+X\hat{}(7);$ $dKa(2)=dKa(2)+X\hat{}(8);$ K9.4) Correction of the accelerometer zero shifts $dAo(1)=dAo(1)+X\hat{}(9);$ $dAo(2)=dAo(2)+X\hat{}(10);$ $dAo(3)=dAo(3)+X\hat{}(11).$ K9.5) Correction of gyro scale factors $dKom(3)=dKom(3)+X\hat{}(12).$ K9.6) Correction of gyro drifts $dOMo(1)=dOMo(1)+X\hat{}(13);$ $dOMo(2)=dOMo(2)+X\hat{}(14);$ $dOMo(3)=dOMo(3)+X\hat{}(15).$ K9.7) Correction of the odometer scale factor $dKod=dKod+X\hat{}(16).$ K9.8) The IMU Output parameters arriving at the Airbag control 66

Figure 11:
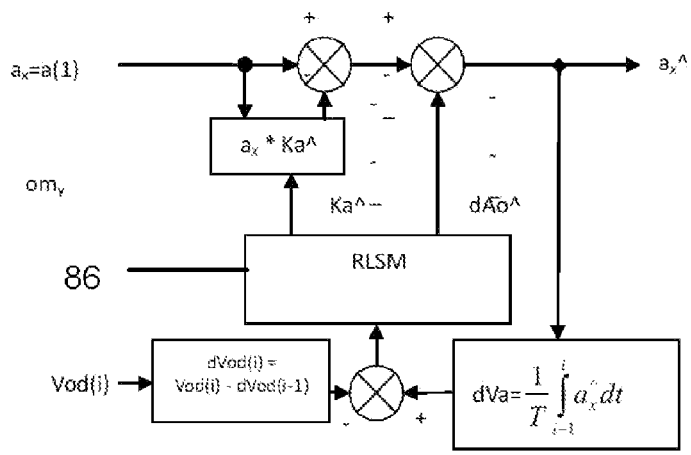
FIG. 11 is a diagram showing a preferred accelerometer X calibration using the odometer velocity Vod.
Figure 12:
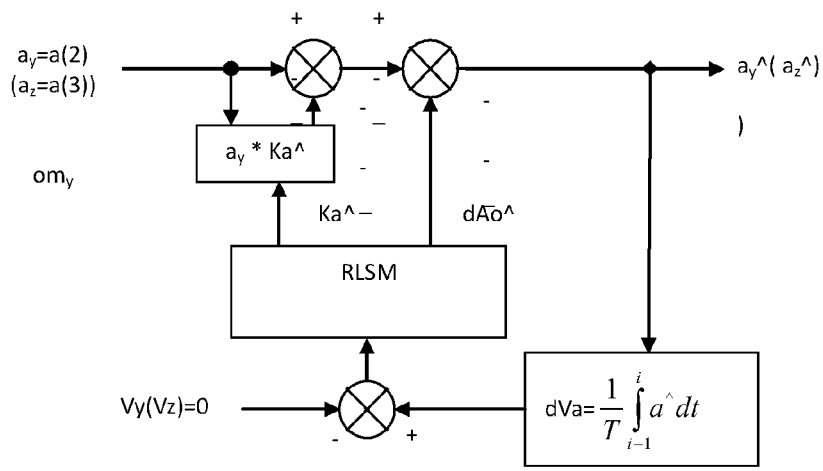
FIG. 12 is a diagram showing a preferred Y (Z) accelerometer calibration using Vy(Vz)=0.

$a\hat{}=Cgc^T a_g$ (or $a\hat{}=a-Cgc^T(0;0;g)$) is the compensation of the acceleration projection $g_a$ due to the tilt of the IMU;

$a\hat{}(2)=a\hat{}(2)-om(3)Vc(1)$ is the compensation of the centrifugal acceleration, where $Vc=Cgc^T V_g;$ $om\hat{}=om.$ 8. "Minimal" Variant 8.1 Block Diagram of the "Minimal" Algorithm FIGS. 10, 11 and 12 show a block diagram of the algorithm for calibration of accelerometers used in the "Minimal" variant of the system.

The algorithm can be divided into the following sequence of steps:

a) Compensation of the centrifugal acceleration in the Y accelerometer readings $a_y = a_y - om_z Vod$ (block 81).

b) Calculation of the matrix Chc of orientation between the accelerometer-fixed coordinate system and the horizontal coordinate system using an Attitude Filter 83, preceded by a low-pass filter 82).

c) Compensation of the gravitational acceleration due to accelerometer tilts with respect to the horizon plane in accelerometer readings $a\hat{} = a - Chc^T(0,0,g)^T.$ (block 84)

d) Calibration and compensation of accelerometer scale factor errors and zero shifts in block 85 using the odometer readings (for the X accelerometer) and the equality to zero of the vehicle lateral and vertical velocity (for the Y and Z accelerometers). Error separation under noise environment is carried out using the Recursive Least Square Method (RLSM). For this purpose, errors in the velocity increments over a given time interval are used. In this case, the odometer readings are taken into account for the longitudinal axis, and the equality to zero of the vehicle velocities in these directions is taken into account for the lateral and vertical axes.

Notes:

a) The error in the scale factor dAo(2) of the Y accelerometer can be poorly calibrated due to a small value of the lateral acceleration. In this case, it is necessary to restrict oneself to the zero shift calibration dAo only (2).

b) The error in the scale factor dKa(3) of the Z vertical accelerometer can be calibrated together with the shift of its zero dAo(3) as a sum of Sa=Ka(3)g+dAo(3). The separation of these errors can be found to be difficult because of a small difference between the measured acceleration a(3) and the Earth acceleration gravity g. In this case, when compensating the Z accelerometer error, it is permissible to assume that the zero shift estimate dAo(3)ˆof the Z accelerometer is equal to Sa. If dAo(3)<<Ka(3)g, then it should be considered that Ka(3)ˆ=Sa/g. It is noteworthy that the scale factor value is very important for the airbag system since the decision on the emergency situation is made for sufficiently large linear accelerations (of about 4 g, FIG. 1).

8.2 Attitude Filter 83 (shown in FIG. 10)

The goal of the Attitude Filter 83 is to determine the matrix of mutual orientation between the IMU-related coordinate system and the horizontal coordinate system. Usually, for this purpose, the fact is used that accelerometers measure, in average, gravitational accelerations (with a reverse sign, see the Appendix). Under static conditions, this is sufficient for determining the Roll and Pitch angles. When the object is in motion, three-dimensional accelerations occur that influence the errors in determining the Roll and Pitch angles. Particularly dangerous are space vibrations, which generally can result in the wrong determination of the vertical.

The use of different kinds of frequency filters in the accelerometer channels (which is natural under these conditions) leads to long signal delays, and the calculated values of the roll and pitch angles greatly differ from the real orientation of the object. To eliminate this phenomenon, gyroscopes are used. They measure high-frequency vibrations of the object well, however, result in great systematic errors in its orientation due to the large drift.

In U.S. Pat. No. 6,421,622, entitled "Dynamic Attitude Measurement Sensor and Method", it is proposed to determine the orientation using gyros as in conventional inertial systems and to correct it from very smooth readings of accelerometers, which measure the gravitational acceleration vector on the average.

In principle, the Kalman filter 63 can also be used for solving this problem.

Note:

Based on the experience of the inventors developments, the Kalman filter 63 is used only in the extreme cases where it is impossible to do without it such as in cases where the high dimensionality of the state vector with the low dimensionality of the observation vector, complex relations between parameters, impossibility to decompose the problem etc. The reason is that it is difficult to tune the Kalman filter 63 for all real life cases. The inventors usually apply the least square method and its variations. Together with the recursive refinement of the parameters to be estimated, it has proven to be a very good method in real systems. Therefore, in the instant case as well, with a great variety of vehicle situations, it is desirable to use the robust methods of signal processing and the Kalman filter 63 only as a last resort.

Figure 13:
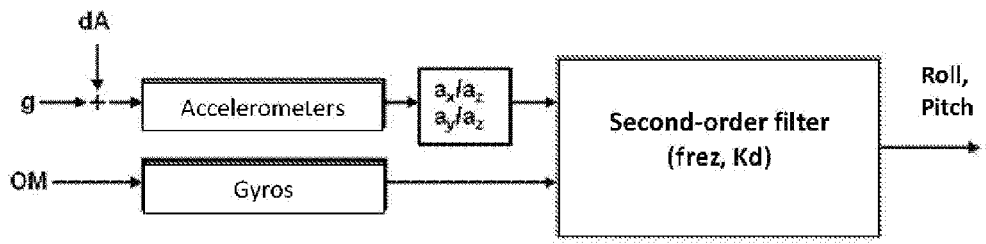
FIG. 13 is a diagram showing a preferred Accelerometer and Gyro Transfer Function module.
Figure 14:
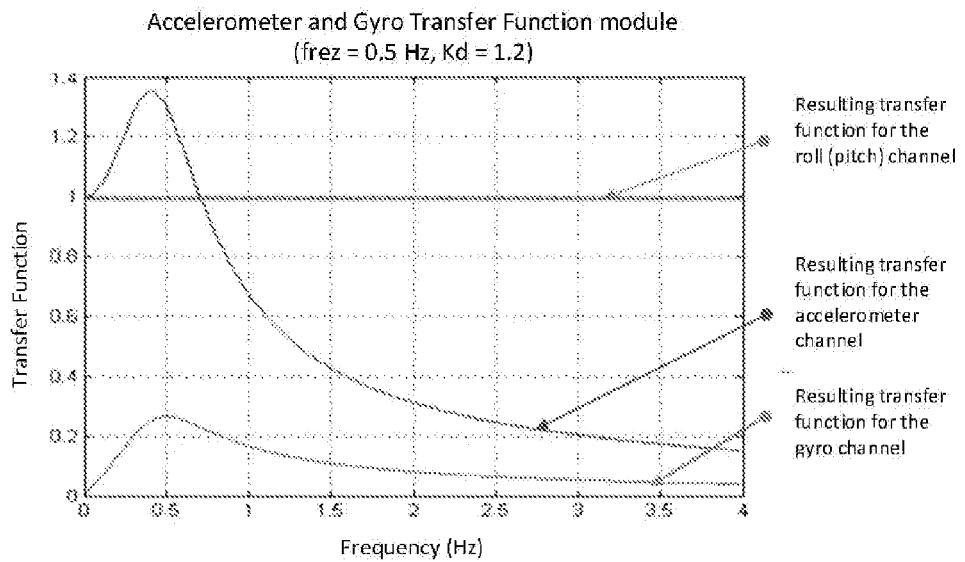
FIG. 14 is a diagram showing a preferred Transfer Function of the Attitude Filter.

It is proposed here to use a filter which uses the property of accelerometers to determine, on the average, the object orientation with respect to the vertical in a low frequency range, and the property of gyros to determine well the object orientation in the high-frequency range. Filter parameters in the accelerometer and gyro channels are preferably chosen to have, in the aggregate, a unit transfer function in the whole range of operating frequencies for the roll and pitch angles. FIG. 14 illustrates the transfer functions between signals from sensors (accelerometers, gyros) and the angles (roll and pitch) for the filter tuning: the resonant frequency frez=0.5 Hz, the damping ratio Kd=1.2, which transfer functions may be derived from the module shown in FIG. 13.

The Attitude Filter software in the MATLAB environment looks like:

Initial conditions:
  fREZ_filt_x= . . . ; % Hz is the resonant frequency of the roll filter
  kd_ALFAx= . . . ; % is the damping parameter of the roll filter $kx1=kd\_ALFAx*(fREZ\_filt\_x*pi*2.0);$ $kx2=(fREZ\_filt\_x*pi*2.0)^2;$ fREZ_filt_y= . . . ; % Hz is the resonant frequency of the pitch filter
  kd_ALFAy= . . . ; % is the damping parameter of the pitch filter $ky1=kd\_ALFAx*(fREZ\_filt\_x*pi*2.0);$ $ky2=(fREZ\_filt\_x*pi*2.0)^2;$ Chc=E, where E is the unit matrix, $x4\_1=0;$ $y4\_1=0;$ The algorithm executed in the cycle of measurement arrival is:
%======the beginning======

$OMG\_n=om;$ a_hor=Chc*a; % is the "apparent" acceleration in the horizontal coordinate system % is the roll filter
  if 0.001>abs(a_hor(3)) % to avoid the situation sign (0)=0

$a\_hor(3)=0.0001;$ $a\_hor(1)=0;$ $a\_hor(2)=0;$ end x4=a tan(a_hor(2)/a_hor(3)); % is the quantity to be observed
if abs(x4)>=1.553; % 89*pi/180;% is the limiter for 89 grads $x4=sign(x4)*1.553;$ end if x4_1==0 x4_1=x4; ALFAx_n=x4; end % is the start at the initial instant of time x3_n=x3_n+kx2*T*(x4+x4_1)/2;% is the estimate of the Y gyro drift
x4_1=x4;% the storage of the previous value
if abs(x3_n)>=DOP_3% is the limiter for the gyro drift estimation $x3\_n=sign(x3\_n)*DOP\_3;$ end
% the roll angular velocity
if −0.1<co_ALFAy_n<0.1 co_ALFAy_n=0.1; end % 5 deg is the protection from the division by zero "0"

$OMx=OMG\_n(1)+(OaMG\_n(2)*si\_ALFAx\_n+OMG\_n(3)*co\_ALFAx\_n)*si\_ALFAy\_n/co\_ALFAy\_n;$ $x1=OMx+x4*kx1+x3\_n;$

ALFAx_n=ALFAx_n+T*(x1+x1_1)/2; % is the integral
x1_1=x1; % is the storage of the previous value
if abs(ALFAx_n)>DOP_ALFA % is the limiter for ALFAx estimation $ALFAx\_n=sign(ALFAx\_n)*DOP\_ALFA;$ end $si\_ALFAx\_n=sin(ALFAx\_n);$ $co\_ALFAx\_n=cos(ALFAx\_n);$ %-----end of the roll filter----------
% Calculation of the matrix Chor_c_x(si_ALFAx_n)

$Chor\_c\_x(1,1)=1;Chor\_c\_x(1,2)=0;Chor\_c\_x(1,3)=0;$ $Chor\_c\_x(2,1)=0;Chor\_c\_x(2,2)=co\_ALFAx\_n;\ Chor\_c\_x(2,3)=-si\_ALFAx\_n;$ $Chor\_c\_x(3,1)=0;Chor\_c\_x(3,2)=si\_ALFAx\_n;\ Chor\_c\_x(3,3)=co\_ALFAx\_n;$ %======the end of the roll channel======
%======
% the pitch channel
%_____
y4=−a tan(a_hor(1)/a_hor(3)); % the quantity to be observed
if abs(y4)>=1.553; %89*pi/180—the limiter for 89 grads $y4=sign(y4)*1.553;$ end
%------the beginning of the pitch filter------ if y4_1==0 y4_1=y4;ALFAy_n_1=y4;end $y3\_n=y3\_n+ky2*T*(y4+y4\_1)/2;$ % the estimate of the X gyro drift $y4\_1=y4;$ if abs(y3_n)>=DOP_3

$y3\_n=sign(y3\_n)*DOP\_3;$ end $OMy=OMG\_n(2)*co\_ALFAx\_n-OMG\_n(3)*si\_ALFAx\_n$; % the pitch angular velocity $y1=OMy+y4*ky1+y3\_n$;

$ALFAy\_n=ALFAy\_n+T*(y1+y1\_1)/2$;

$y1\_1=y1$;

if abs(ALFAy_n)>DOP_ALFA $ALFAy\_n=\text{sign}(ALFAy\_n)*DOP\_ALFA$;

end $si\_ALFAy\_n=\sin(ALFAy\_n)$;

$co\_ALFAy\_n=\cos(ALFAy\_n)$;

%-----the end of the pitch filter------
% Calculation of the matrix Chor_c_y(si_ALFAy_n)

$Chor\_c\_y(1,1)=co\_ALFAy\_n; Chor\_c\_y(1,2)=0; Chor\_c\_y(1,3)=si\_ALFAy\_n$;

$Chor\_c\_y(2,1)=0; Chor\_c\_y(2,2)=1; Chor\_c\_y(2,3)=0$;

$Chor\_c\_y(3,1)=-si\_ALFAy\_n; Chor\_c\_y(3,2)=0; Chor\_c\_y(3,3)=co\_ALFAy\_n$;

%======the end of the pitch channel======
%======

$Chor\_c=Chor\_c\_y*Chor\_c\_x$; % resulting "coupled-horizontal" matrix $Chc=Chor\_c$;

$om(1)\hat{}=OMx+x3\_n$;

$om(2)\hat{}=OMy+y3\_n$;

%_____the end_____

8.3 Recursive Least Square Method (RLSM)

The zero drifts $dAo\hat{}$ and scale factor errors $Ka\hat{}$ of accelerometers from the known increments in the linear velocity errors (FIGS. 11 and 12) can be found by different methods. The use of the recursive least square method is the most suitable. For this purpose, the increment in the velocity $dV_N(k)$ is calculated over every N time steps $$dV_N(k)=H(k)b+\xi_v,$$

where k is the number of the measurement, $$H(k) = \left( T\sum_{i=1}^{N} a(i), iT \right),$$

$b=(dKa, dAo)^T$ are the parameters to be estimated (the error in the accelerometer scale factor and the zero shift), $\xi_v$ is the error in the velocity increment with the variance $\sigma^2$.

The algorithm for the LS-filter is similar to the Kalman filter $$b\hat{}(k)=K(k)(dV_N(k)-H(k)b\hat{}(k-1)), \quad (8.3.1)$$

where $$K(k)=P(k-1)H^T(k)/[H(k)P(k-1)H^T(k)+\sigma^2], \quad (8.3.2)$$

$$P(k)=[E-K(k)H(k)]P(k-1), \quad (8.3.3)$$

k=1 . . . K.

The RLSM 86 operates cyclically with an interval of K time steps. To compensate accelerometer errors (FIGS. 11 and 12) the values of $dK\hat{}(j-1)$, $dAo(j-1)$ from the previous cycle of their calibration (j−1) are used during the j-th cycle of the RLSM. After the completion of the j-th calibration cycle, new values of $dK\hat{}(j)$, $dAo(j)$ are used instead of the values of $dK\hat{}(j-1)$, $dAo(j-1)$ and the (j+1)th cycle of the RLSM operation begins.

Before the beginning of each cycle of the RLSM operation, the initial value of the matrix P(k) is prescribed.

Note that the estimation of the parameters to be sought can be performed by the ordinary (non-recursive) least square method as well, for whose implementation there is no need to know the variance $\sigma^2$. However, in this case it will be necessary to acquire a set of measurements and the matrix H.

Conclusion:

1. Three variants of the Airbag accelerometer calibration system, namely, the Maximal, Basic, and Minimal have been considered. Each of the variants has its own advantages and disadvantages. The "Basic variant" is believed at this time to be the most promising because of its autonomy and simplicity, and can be recommended for implementation after the computer simulation testing. This does not preclude the possibility of practical implementation of the Maximal variant with the IMU correction using GPS, depending on, for example, the circumstances.

2. The efficiencies of each of the calibration methods considered above can be estimated after the computer simulation testing. The final efficiency of the method can be obtained after testing a prototype, which, if necessary, could be developed, manufactured and tested on one location with a subsequent transfer of the required documentation to the manufacturing plant for batch production, possibly in a different location. To do this, all necessary specialists and conditions are available.

Figure 15A:
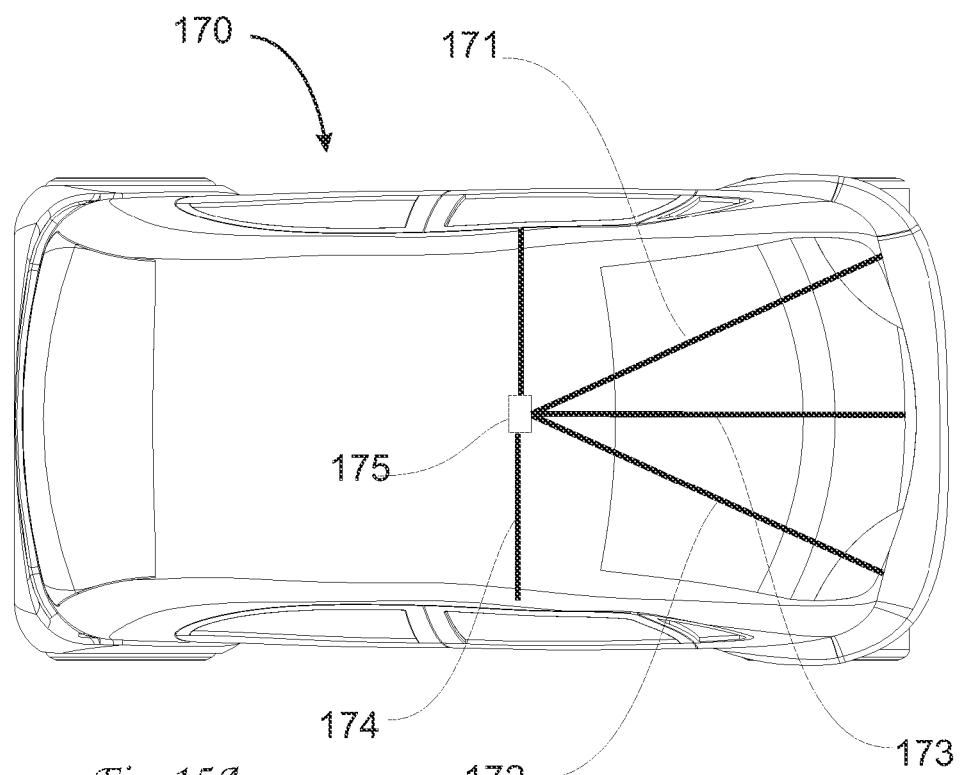
FIGS. 15A and 15B illustrate the single point sensor option using an IMU with FIG. 15A illustrating stiff members connecting the sensors to the vehicle's front and side crush zones and FIG. 15B illustrating the placement of a MEMS accelerometer or an IMU single point sensor where the stiff connecting members are not used for frontal impact sensing.

In an embodiment of a very low cost airbag system, the frontal airbag system can be triggered by a centrally mounted crash sensor. This crash sensor can be in the form of an inertial measurement unit (IMU) or of a single axis or biaxial MEMS accelerometer either of which is illustrated generally in FIGS. 15A and 15B at 175. More generally, the crash sensor may be any single sensor or combination of sensors that are effective to measure, determine, detect or sense an inertial property of the vehicle. Also, in addition to or instead of the frontal airbag system, one or more other types of airbag systems known to those skilled in the art may be triggered by the centrally mounted crash sensor.

The IMU or a single or dual axial accelerometer 175 can be mounted onto a structural member and this structural member can be attached to the front of a vehicle 170 by elongate members 171, 172, and 173 and to the sides of the vehicle by elongate members 174. The point of attachment of structural members 171-174 to the structural member 175 may be at the inward end or edge regions of the structural members 171-174.

Elongate member 172 extends substantially parallel to the lateral sides and longitudinal axis of the vehicle, while elongate members 171, 173 extend at an angle to the sides of the vehicle and the longitudinal axis of the vehicle (generally toward the right and left front corners of the vehicle). The members 171-174 may be stiff or rigid, and fixedly or rigidly attached to body or frame of the vehicle at a location in the crush zones of the vehicle so that during a crash or accident involving the vehicle 170, they, individually or in combination, transfer a crash pulse from the crush zone to the IMU 175 so that the IMU 175 experiences substantially the same accelerations that it would experience if it were located at the other ends of the members 171-174. In some cases, these members can be part of the vehicle structure (the body or frame) as long as they transfer the accelerations or crash pulse to the IMU 175 during the first few milliseconds of the crash and not to the vehicle as a whole so that the IMU 175 can change its velocity relatively independent of the vehicle body or frame. By this technique, a single IMU can be used to sense crashes into both the front and the sides of the vehicle 170, or wherever the outward ends of the elongate members 171-174 are situated. The crash pulse generated from the sensed crash is typically processed by a processor associated with the IMU 175, i.e., within the same depicted rectangular component in FIGS. 15A and 15B, that determines whether or not to deploy the frontal airbag system, or any other airbag systems, based on the crash pulse, and possibly other factors known to those skilled in the art such as occupancy of the vehicle 170.

Figure 15B:
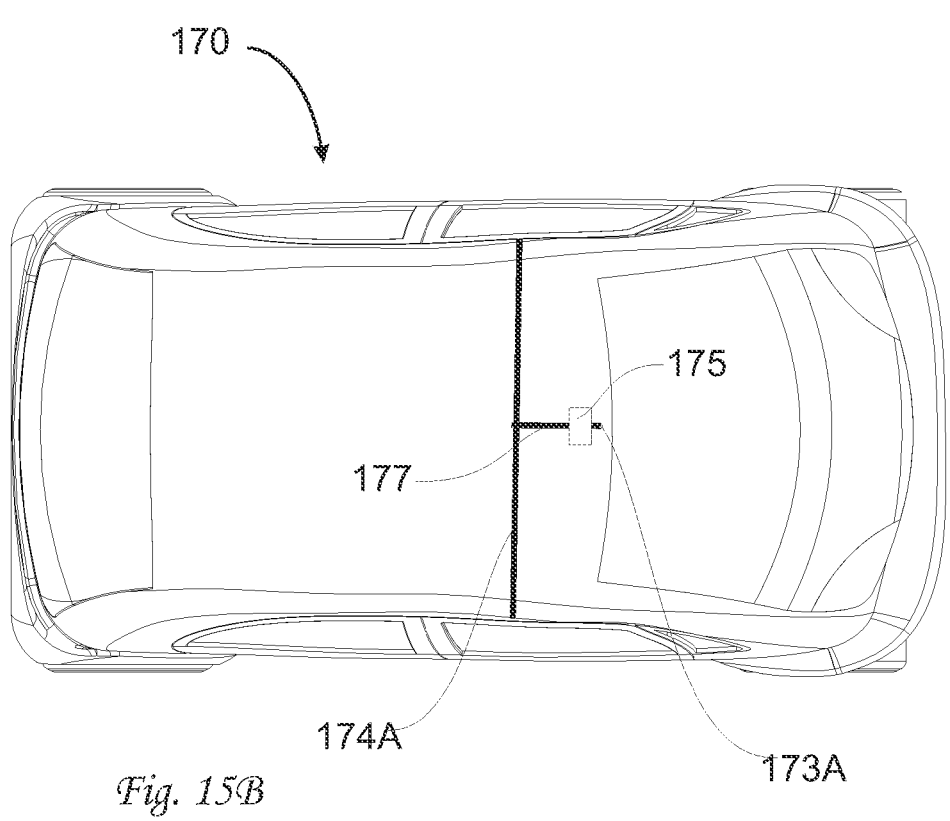

In the implementation illustrated in FIG. 15B, stiff members 174A, one each extending from the center of the vehicle 170 to a respective lateral side of the vehicle 170, can act on another stiff member 177 which acts like a lever arm and pivots at attachment point 173A. In this embodiment, the side acceleration that acts on the sensor 175 is reduced by a factor of 10:1, or other appropriate amount, thereby allowing the use of a more sensitive accelerometers in the sensor 175.

6 Accelerometer Solution—Measurement of the Angular Velocity and Angular Acceleration by Accelerometers As briefly discussed above, an alternate configuration is to use an IMU based on 6 accelerometers rather than 3 accelerometers and 3 gyros. The analysis below, however, shows that even with a separation between the two accelerometers of one meter, the angular velocity and displacement results in sub- stantially larger errors. A more reasonable separation would be a few centimeters at most if the device is to reside in a single package.

Figure 16:
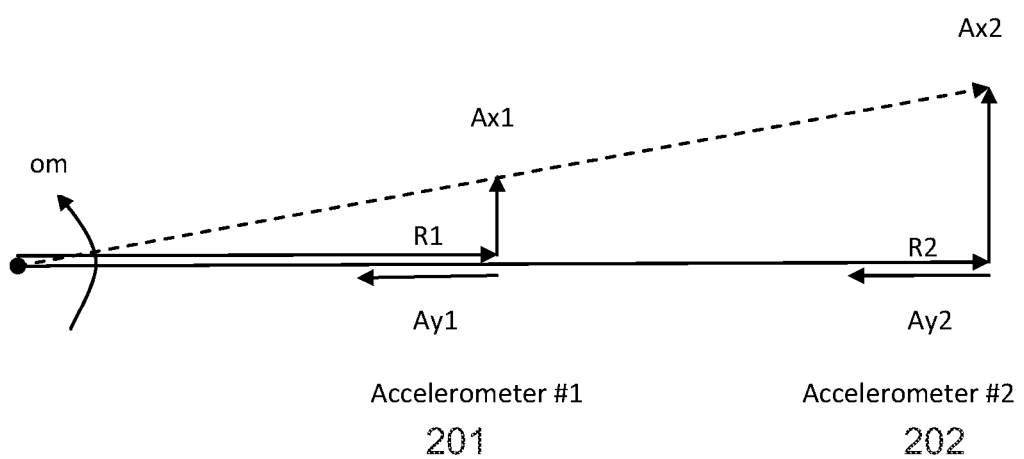
FIG. 16 is a drawing showing the use of two accelerometers for measuring angular motion in place of a gyroscope.

FIG. 16 shows a diagram of accelerometers, 201 and 202, measuring the angular velocity om and angular acceleration om'=dom/dt.

1) Measurement of the angular acceleration $Ax1 = om'R1$, $Ax2 = om'R2$, $om' = (Ax2-Ax1)/(R2-R1) = dAx/dR$, where $dAx = Ax2-Ax1$, $dR = R2-R1$.

Accuracy of measurement of angular acceleration $dom' = (dAx1-dAx2)/dR = dAx/dR$, where $dAx = dAx1-dAx2$, $dAx1, dAx2$—accelerometers error.

2) Measurement of the angular velocity $Ay1 = om^2 R1$, $Ay2 = om^2 R2$, $om = ((Ay2-Ay1)/(R2-R1))^{1/2} = (dAy/dR)^{1/2}$, where $dAy = Ay2-Ay1$, $dR = R2-R1$.

Accuracy of measurement of angular velocity $dom \leq ((dAy1-dAy2)/dR)^{1/2} = (dAy/dR)^{1/2}$, where $dAy = dAy1-dAy2$.

$dAy1, dAy2$—accelerometers error.

Errors of measurement of angular motion as a function of time ($dAx = dAy = 0.01 \ldots 0.001$ m/s², drift of the MEMS gyroscope—$0.1 \ldots 1.0$ deg/s, dR=1 m)

| | | | | | Accelerometer | | | | |
|---|---|---|---|---|---|---|---|---|---|
| | Gyroscope | | | $om = ((Ay2 - Ay1)/(R2 - R1))^{1/2}$ | | | $om' = (Ax2 - Ax1)/(R2 - R1)$ | | |
| | | | | | Time | | | | |
| Parameter | 1 sec | 10 sec | 100 sec | 1 sec | 10 sec | 100 sec | 1 sec | 10 sec | 100 sec |
| Angular acceleration, deg/sec² | — | — | — | — | — | — | 0.06 ... 0.6 | 0.06 ... 0.6 | 0.06 ... 0.6 |
| Angular velocity, deg/sec | 0.1 ... 1.0 | 0.1 ... 1.0 | 0.1 ... 1.0 | <1.8 ... 5.7* | <1.8 ... 5.7 | <1.8 ... 5.7 | 0.06 ... 0.6 | 0.6 ... 6 | 6 ... 60 |
| Angle, deg | 0.1 ... 1.0 | 1 ... 10 | 10 ... 100 | <1.8 ... 5.7 | <18 ... 57 | <180 ... 570 | 0.03 ... 0.3 | 3 ... 30 | 300 ... 3000 |

*The error decreases with increasing angular velocity

Conclusions:
1) Accelerometers measure the angular velocities and displacements with significantly larger errors than gyros.
2) Accelerometers measure the vibrations, which are always large (0.1 g or more) on real objects such as vehicles. This fact greatly reduces the accuracy of the angular velocity.

The inventions described above are susceptible to many variations, combinations of disclosed components, modifications and changes, all of which are within the skill of the art. It should be understood that all such variations, modifications and changes are within the spirit and scope of the inventions and of the appended claims. Similarly, it will be understood that applicants intend to cover and claim all changes, modifications and variations of the examples of the preferred embodiments of the invention herein disclosed for the purpose of illustration which do not constitute departures from the spirit and scope of the present invention as claimed.

Although preferred embodiments are illustrated and described above, there are possible combinations using other geometries, sensors, materials and different dimensions for the components that perform the same functions. This invention is not limited to the above embodiments and should be determined by the following claims.

APPENDIX

Special Features of Accelerometer Operation in the Airbag System

A primary element of any system of accident identification is an accelerometer. Therefore, we first consider some of its physical features which influence the quality of solving the problem set. In so doing, we will deal with the steady-state processes after the completion of the transient processes.

The sensitive element of any accelerometer is the inertial mass that is connected to the frame through an elastic element. In the initial state, the sum of all the forces (of inertia and the spring) acting on the mass of the sensitive element is equal to zero. Under the action of a constant force, the vehicle and, consequently, the accelerometer frame begin to move with constant acceleration. Due to the inertia law, the sensitive mass of the accelerometer tries to remain stationary in the inertial space, whereas the accelerometer frame begins to move with the force-induced acceleration. In this case, the sensitive mass starts to move with respect to the accelerometer frame until the spring compression/tension force balances the inertia force of the sensitive mass. This displacement is the accelerometer output signal and is measured using one of the known techniques (for example, by a capacitive or inductive sensor).

In this process, there is one exception for the gravitational forces. The gravitational forces act in the same way on both the accelerometer (vehicle) frame and its sensitive mass. For this reason, the accelerometer measures the accelerations induced by the action of all the forces, except for the gravitational ones (the so-called "active" forces only).

We will demonstrate this with a simple example. An accelerometer with its axis directed vertically is mounted in an elevator. The elevator falls with the gravitational acceleration (of the force of gravity) equal to g=9.780 м/с² on the equator and g=9.832 м/с² at the poles (the difference is 0.052 m/s²). Under the action of the force of gravity, the accelerometer frame and inertial mass fall with the same acceleration g, the relative displacement is absent, the spring is in the "zero" position. The accelerometer output signal is equal to zero despite its fall acceleration is equal to g.

Note that the acceleration due to gravity differs from the one of the gravitational force by the centrifugal component due to the Earth's rotation that has different values at different latitudes (the maximum value is at the equator).

Then, what does the accelerometer show when it stands on the Earth? It is stationary, its acceleration is equal to zero, and the accelerometer shows the value of g, with this acceleration being directed upward, whereas the gravity force (and, correspondingly, the acceleration due to gravity) is directed downward toward the Earth center.

We will consider this question in more detail. The sensitive mass of the accelerometer $m_a$ is in balance under the action of its weight $Pm_a=m_a(-g)$ (the sign "−" denotes that the free fall acceleration acts downward toward the Earth center) and the stiffness force C of the spring $Pc=C^*x$ (x is the displacement of the sensitive mass with respect to the accelerometer frame) $Pm_a+Pc=0$. Hence, $C^*x=m_a g$ and the output signal of the accelerometer X with dimensions of m/s² is equal to $$X=x/Ka=g, \quad (A.1)$$

where $Ka=m_a/C$ is the accelerometer scale factor.

The question arises what force does the acceleration "+g" correspond to? To this end, we will consider the balance of forces at the point of the spring attachment to the accelerometer frame $$-Pc+R=0,$$

where R is the Earth response to the spring via the accelerometer frame.

Whence it follows that $$-C^*x+R=0 \Rightarrow x=R/C. \quad (A.2)$$

By substituting expression (1.2) into expression (1.1) we obtain $$X=(R/C)/Ka=(R/C)/(m_a/C)=R/m_a=g. \quad (Supp1.3)$$

Thus, when the accelerometer is installed on the ground, it measures the acceleration induced by the Earth response to the accelerometer, which is equal in magnitude and opposite in sign to the free fall acceleration. In order to calculate the true value of the acceleration, for example, for the integration of the velocity and coordinates to the accelerometer readings, it is necessary to add the free fall acceleration.

Consider the manner in which this influences the accelerometer operation in the airbag crash sensor system. To detect the frontal impact, the accelerometer sensitivity axis is directed along the vehicle longitudinal axis. In the general case, the vehicle longitudinal axis X is out-of-level. The angle α between the horizon plane and the sensitivity axis of the longitudinal horizontal accelerometer can reach 0.1 rad due to the road grade of 10%. As this takes place, the projection of the vertical acceleration caused by road on the sensitivity axis of vertical acceleration accelerometer will be $a_x=g \sin(\alpha)$, which is approximately equal to 0.1 g. This component of the acceleration changes rather slowly with road profile. Whereas tilts of the vehicle when it goes cross country, over a speed bump, under quick acceleration or emergency breaking can reach more than 0.1 rad. Thus, the accuracy of measuring linear accelerations in the ordinary airbag system, even without considering accelerometer errors, is about 0.1 g.

It is possible to reduce this error by way of compensation of the gravitational component of the linear acceleration. For this purpose, it is necessary to know the deviations of the horizontal accelerometer sensitivity axes with respect to the vertical. In this case, the compensation of the influence in the acceleration of the Earth's response to the vehicle can be carried out by two ways:

First: by adding the projection of the free fall acceleration to accelerometer readings taking into account the sign of its direction $A=a_x-g \sin(\alpha)$. In this case, to improve the accuracy, it is desirable to know a mean value of the free fall acceleration in the terrain accuracy (the equatorial region, middle latitudes, high latitudes) where the vehicle is used.

Second: by the re-projection of accelerometer readings onto the horizontal plane $A=a_x \cos(\alpha)-a_z \sin(\alpha)$, where $a_z$ are the vertical accelerometer readings. In this case, there is no need to take into account the free fall acceleration since its projection onto the horizontal plane is equal to zero. However, in this instance, a decision about a car accident will be made from the horizontal component of the projection of the vehicle longitudinal acceleration that differs from the longitudinal acceleration by the value of $|(1-\cos(6.4°))|g<0.006$ g, which is comparable with the error of the MEMS accelerometer. This acceleration will not be influenced by variations in the change of the vehicle orientation with respect to the vertical when the road grade changes and when going cross country.

To implement both of the approaches, it is necessary to know, to sufficient accuracy, the angle $\alpha$. For this purpose, the IMU can be used in the vertical mode. The essence of the MEMS-based inertial vertical stems from the circumstance that accelerometers measure the acceleration vector inverse to the acceleration due to gravity, on the average, over a sufficiently long period of time, whereas the rapidly-varying component of the orientation is compensated using gyros. Such vertical works well for a stationary (not moving) object and is perturbed with a change in the acceleration of its movement. The error in the vertical (the angle $\alpha$) for the MEMS IMU in motion does not usually exceed 2 degrees. This will result in the horizontal acceleration measurement error of $|g \sin(\alpha)| < 0.035$ g.

The error in the vertical can be reduced by using GPS signals for the correction. The velocity vector and coordinates are measured by the GPS system in the geographical coordinate system. For the IMU/GPS integration, it is necessary to reduce their readings to a unified coordinate system (either geographical or the IMU-related one). In any case, it is necessary to know the IMU orientation towards the North. But this is already a sufficiently complex task. The problem is that the accuracy of MEMS-gyros is insufficient for the initial course alignment of the IMU. Furthermore, the GPS makes it possible to perform the course correction for the IMU only when the vehicle moves with acceleration. When the vehicle is not in motion, and the GPS naturally loses its operational capability, the IMU course is not GPS corrected. When the vehicle moves at a constant speed, the necessary condition for the course correction is the convergence of the velocity vector direction with the longitudinal axis of the vehicle, which is not always feasible.

Usually, to solve this kind of problem, a magnetic sensor is used in the IMU. However, it also has many problems related to calibration and magnetic deviation compensation. In addition, the operability of the magnetic sensor at the site of the IMU mounting in the vehicle casts great doubt.

One way out of this situation is to determine the initial course from the speed or increment in the coordinates measured by the GPS.

When the vehicle is not in motion, it is possible to determine the roll and pitch only from accelerometer readings to an accuracy of zero bias of accelerometers or from the zero bias of accelerometers to an accuracy of the unknown roll and pitch multiplied by g. Therefore, the concept of accelerometer calibration, when the vehicle is not in motion, in the general case is unworkable (only in the horizontal position of accelerometers). This is not the case with gyroscopes. The gyroscope zero bias is calibrated very well when the vehicle is not in motion since MEMS-based gyros are not sensitive to the Earth's rotation, and their orientation with respect to the Earth is of no importance for the calibration.

General conclusion: as the amount of equipment increases, the possibilities for more accurate measurement of the acceleration are enhanced, but with the growing number of problems which reduce the reliability of solving the set task.

Figure 17:
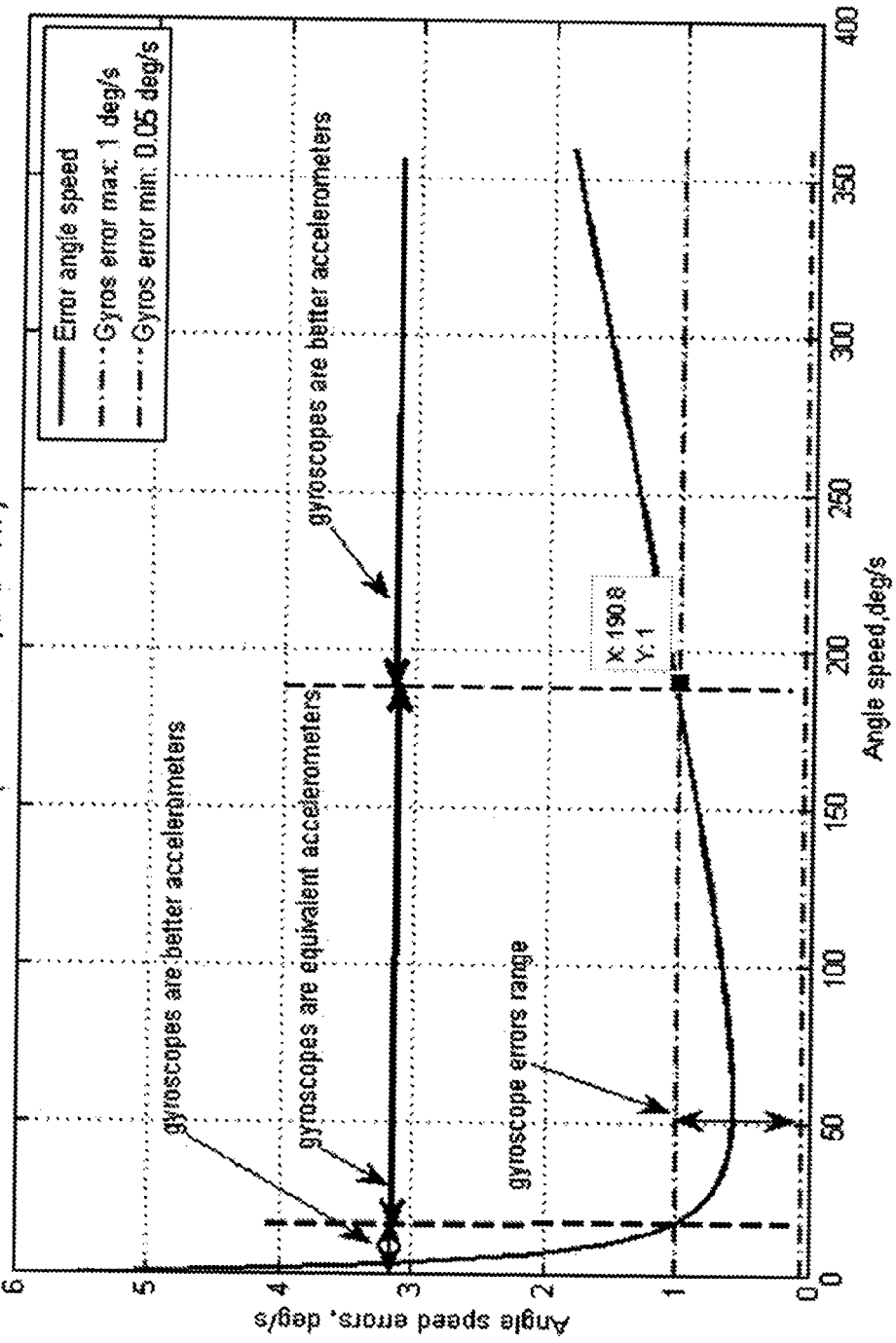
FIG. 17 is a chart of the dependence of angle speed errors of an inertial measurement unit (IMU) without gyroscopes on the angle speed.

Dependence of angle speed errors of IMU without gyroscopes on the angle speed is charted in FIG. 17.

Conclusion:
0 . . . 18 deg/s (navigation mode)—better gyroscope;
18 . . . 190 deg/s—equivalent;
>190 deg/s—better gyroscope.

What is claimed is:
1. An arrangement for a vehicle, comprising:
an electronic crash sensor system, comprising:
at least one inertial measurement device arranged on the vehicle to measure an inertial property of the vehicle;
a processor that incorporates or executes a crash sensing algorithm that determines whether the vehicle is sensing a crash based on the inertial property measured by each of said at least one inertial measurement device; and
a positioning system arranged on the vehicle to provide a position of said positioning system that is considered as a position of the vehicle,
the inertial property measured by each of said at least one inertial measurement device being modified based on the position provided by said positioning system and then provided to said crash sensing algorithm such that said crash sensing algorithm determines whether the vehicle is sensing a crash based on the modified inertial property measured by each of said at least one inertial measurement device,
whereby self-testing of said at least one inertial measurement device is not performed; and
at least one occupant protection device arranged on the vehicle, each of said at least one occupant protection device being coupled to said crash sensor system and being actuated based on the determination by said crash sensing algorithm whether the vehicle is sensing a crash.

2. The arrangement of claim 1, wherein said at least one inertial measurement system comprises an accelerometer and acceleration values measured by said accelerometer are modified based on the position provided by said positioning system.

3. The arrangement of claim 2, further comprising means for comparing integrated output of said accelerometer with the position provided by said positioning system and using information about differences therebetween to modify the acceleration values measured by said accelerometer.

4. The arrangement of claim 3, wherein said means comprise a Kalman filter.

5. The arrangement of claim 1, wherein said at least one inertial measurement system comprises a gyroscope and angular velocity values measured by said gyroscope are modified based on the position provided by said positioning system.

6. The arrangement of claim 5, wherein said at least one inertial measurement system further comprises an accelerometer and acceleration values measured by said accelerometer are modified based on the position provided by said positioning system, further comprising means for comparing integrated output of said accelerometer with the position provided by said positioning system and using information about differences therebetween to modify the acceleration values measured by said accelerometer, said means comprising a Kalman filter or neural network.

7. The arrangement of claim 6, wherein said Kalman filter or neural network is configured to eliminate an effect of errors in acceleration values measured by said accelerometer on the angular velocity values measured by said gyroscope and an effect of errors in angular velocity values measured by said gyroscope on the acceleration values measured by said accelerometer.

8. The arrangement of claim 1, wherein said at least one inertial measurement device comprises a plurality of inertial measurement devices, each configured to measure a different inertial property of the vehicle.

9. The arrangement of claim 1, wherein said at least one inertial measurement device comprises a plurality of accelerometers, each configured to measure acceleration of the vehicle in a different direction.

10. The arrangement of claim 1, wherein said at least one inertial measurement device comprises a plurality of gyroscopes, each configured to measure angular velocity of the vehicle in a different direction.

11. The arrangement of claim 1, wherein said at least one inertial measurement device comprises a plurality of accelerometers, each configured to measure acceleration of the vehicle in a different direction, and a plurality of gyroscopes, each configured to measure angular velocity of the vehicle in a different direction.

12. The arrangement of claim 1, wherein said processor determines a modification coefficient based on the position provided by said positioning system and applies the modification coefficient to modify the inertial property measured by each of said at least one inertial measurement device, said positioning system being configured to periodically determine its position, said processor retaining the modification coefficient determined when said positioning system determines its position at a first time for use in modifying modify the inertial property measured by each of said at least one inertial measurement device until said positioning system determines its position at a second time.

13. The arrangement of claim 1, wherein said positioning system is a global positioning system (GPS).

14. The arrangement of claim 1, wherein said at least occupant protection device comprises an inflatable airbag.

15. A method for actuating at least one occupant protection device on a vehicle, comprising:
   measuring, using at least one inertial measurement device on the vehicle, an inertial property of the vehicle to obtain inertial data; and
   determining, using a positioning system at least partly on the vehicle, a position of the positioning system considered as a position of the vehicle;
   modifying, using a processor, the measured inertial property based on the position determined by the positioning system;
   determining, using a crash sensor algorithm, whether the vehicle is sensing a crash based on the modified inertial property; and
   controlling actuation of the at least one occupant protection device based on the determination by the crash sensing algorithm whether the vehicle is sensing a crash.

16. The method of claim 15, wherein the at least inertial measurement device comprises an accelerometer such that the inertial property is acceleration.

17. The method of claim 16, wherein the step of modifying the acceleration based on the determined position comprises integrating output of the accelerometer using a processor, comparing the integrated output with the determined position using a processor and using differences therebetween to modify the acceleration.

18. The method of claim 17, wherein a Kalman filter or a neural network is used when modifying the acceleration based on the determined position.

19. The method of claim 15, wherein the at least inertial measurement device comprises a gyroscope such that the inertial property is angular velocity.

20. The method of claim 19, further comprising modifying angular velocity values measured by the gyroscope based on the determined position.

21. The method of claim 15, wherein the at least inertial measurement device comprises at least one accelerometer and at least one gyroscope such that the inertial properties are acceleration and angular velocity.

22. The method of claim 15, wherein the at least one inertial measurement device comprises a plurality of accelerometers, each configured to measure acceleration of the vehicle in a different direction, and a plurality of gyroscopes, each configured to measure angular velocity of the vehicle in a different direction.

23. The method of claim 15, further comprising inputting the modified inertial property into an algorithm of the crash sensor that assess whether the vehicle is experiencing a crash and if so, a magnitude of the crash.

24. The method of claim 15, wherein the positioning system is a global positioning system (GPS).

25. The method of claim 15, wherein the at least occupant protection device comprises an inflatable airbag.

\* \* \* \* \*